United States Patent [19]
Liddell et al.

[11] Patent Number: 6,141,766
[45] Date of Patent: Oct. 31, 2000

[54] SYSTEM AND METHOD FOR PROVIDING SYNCHRONOUS CLOCK SIGNALS IN A COMPUTER

[75] Inventors: David C. Liddell, Gosforth; Emrys J. Williams, Bow Brickhill, both of United Kingdom

[73] Assignee: Sun Microsystems, Inc., Palo Alto, Calif.

[21] Appl. No.: 09/273,782

[22] Filed: Mar. 22, 1999

Related U.S. Application Data

[63] Continuation of application No. 08/784,164, Jan. 25, 1997, Pat. No. 5,889,940, which is a continuation of application No. 08/330,238, Oct. 27, 1994, Pat. No. 5,627,965, which is a continuation of application No. 07/990,844, Dec. 17, 1992, abandoned.

[30] Foreign Application Priority Data

Jul. 17, 1992 [GB] United Kingdom .................. 9215212

[51] Int. Cl.$^7$ ....................................... G06F 11/00
[52] U.S. Cl. .............................. 713/400; 714/49; 714/12; 709/400
[58] Field of Search ................................... 713/400, 500, 713/600; 714/49, 12, 744, 798, 799; 709/400

[56] References Cited

U.S. PATENT DOCUMENTS

| | | | |
|---|---|---|---|
| 4,634,110 | 1/1987 | Julich et al. ............................... | 371/11 |
| 4,700,292 | 10/1987 | Campanini .............................. | 345/516 |
| 4,757,442 | 7/1988 | Sakata ..................................... | 364/200 |
| 4,791,641 | 12/1988 | Hillis ....................................... | 714/761 |
| 4,891,810 | 1/1990 | De Corlieu et al. ...................... | 371/9.1 |
| 5,136,595 | 8/1992 | Kimura .................................... | 714/821 |
| 5,226,152 | 7/1993 | Klug et al. ............................... | 395/575 |
| 5,271,023 | 12/1993 | Norman ................................... | 371/68.3 |
| 5,307,381 | 4/1994 | Ahuja ...................................... | 375/107 |
| 5,371,896 | 12/1994 | Gove et al. ................................. | 712/1 |
| 5,457,789 | 10/1995 | Dietrich, Jr. et al. ................... | 711/100 |
| 5,583,449 | 12/1996 | Buuck et al. ............................. | 326/30 |
| 5,627,965 | 5/1997 | Liddell et al. ........................... | 714/48 |
| 5,712,883 | 1/1998 | Miller et al. ............................. | 375/371 |
| 5,758,053 | 5/1998 | Takeuchi et al. ........................... | 714/4 |
| 5,826,093 | 10/1998 | Assouad et al. ............................ | 712/1 |
| 5,889,940 | 3/1999 | Liddell et al. ............................. | 714/49 |
| 5,961,649 | 10/1999 | Khandekar et al. ..................... | 713/400 |

OTHER PUBLICATIONS

Floyd, Thomas L. Digital Fundamentals, chp 10, pp. 566–567, Jan. 1990.

Williams, Tom "New Approach Allows Painless Move to Fault Tolerance." *Computer Design* 31 (5):51–53 (1992).

Yano, Yoichi et al., "V60/V70 Microprocessor and its Systems Support Functions," *Spring CompCon 88*—33rd *IEEE Computer Soc. Intl. Conf.*, pp. 36–42 (1988).

*Primary Examiner*—Albert De Cady
*Assistant Examiner*—Omar A. Omar
*Attorney, Agent, or Firm*—Conley, Rose & Tayon, PC; B. Noel Kivlin

[57] ABSTRACT

A fault-tolerant computer architecture is described wherein the effect of hardware faults is diminished. The architecture employs a main data bus having a plurality of interface slots for interconnecting conventional computer sub-systems. The number and type of sub-systems may vary considerably, however, a central processor sub-system which encompasses the inventive elements of the invention is always included. The central processor sub-system employs a plurality of central processing modules operating in parallel in a substantially synchronized manner. One of the central processing modules operates as a master central processing module, and is the only module capable of reading data from and writing data to the main data bus. The master central processing module is initially chosen arbitrarily from among the central processing modules. Each central processing module contains a means by which the module can compare data on the main data bus with data on a secondary bus within each module in order to determine if there is an inconsistency indicating a hardware fault. If such an inconsistency is detected, each module generates state outputs which reflect the probability that a particular module is the source of the fault. A synchronization bus which is separate from the main data bus interconnects the central processing modules and transmits the state outputs from each module to every other central processing module.

11 Claims, 20 Drawing Sheets

SYSTEM AND METHOD FOR PROVIDING SYNCHRONOUS CLOCK SIGNALS IN A COMPUTER

This application is a Continuation of Ser. No. 08/784,164 filed on Jan. 25, 1997, now U.S. Pat. No. 5,889,940; which is a continuation of Ser. No. 08/330,238 filed Oct. 27, 1994, now U.S. Pat. No. 5,627,965; which is a File-Wrapper Continuation of 07/990,844 filed Dec. 17, 1992, now abandoned.

BACKGROUND OF THE INVENTION

This invention relates to a fault-tolerant computer system.

The traditional approaches to system reliability attempt to prevent the occurrence of faults through improved design methodologies, strict quality control, and various other measures designed to shield system components from external environmental effects (e.g., hardening, radiation shielding). Fault tolerance methodologies assume that system faults will occur and attempt to design systems which will continue to operate in the presence of such faults. In other words, fault-tolerant systems are designed to tolerate undesired changes in their internal structure or their external environment without resulting in system failure. Fault-tolerant systems utilize a variety of schemes to achieve this goal. Once a fault is detected, various combinations of structural and informational redundancy, make it possible to mask it (e.g., through replication of system elements), or correct it (e.g., by dynamic system reconfiguration or some other recovery process). By combining such fault tolerance techniques with traditional fault prevention techniques, even greater increases in overall system reliability may be realized.

SUMMARY OF THE INVENTION

According to the invention, a fault-tolerant computer architecture is provided wherein the effect of hardware faults is diminished. The architecture employs a main data bus having a plurality of interface slots for interconnecting conventional computer sub-systems. Such sub-systems may include a magnetic disk sub-system and a serial communication sub-system. The number and type of sub-systems may vary considerably, however, a central processor sub-system which encompasses the inventive elements of the invention is always included.

The central processor sub-system employs a plurality of central processing modules operating in parallel in a substantially synchronized manner. One of the central processing modules operates as a master central processing module, and is the only module capable of reading data from and writing data to the main data bus. The master central processing module is initially chosen arbitrarily from among the central processing modules.

Each central processing module comprises a means by which the module can compare data on the main data bus with data on a secondary bus within each module in order to determine if there is an inconsistency indicating a hardware fault. If such an inconsistency is detected, each module generates state outputs which reflect the probability that a particular module is the source of the fault. A synchronization bus which is separate from the main data bus interconnects the central processing modules and transmits the state outputs from each module to every other central processing module.

More specifically, each central processing module comprises a shared data bus connected to the main data bus through a first bus interface. A number of hardware elements are connected to the shared data bus including a read/write memory, an asynchronous receiver/transmitter circuit, a timer circuit, a plurality of control and status registers, and a special purpose read/write memory, the purpose of which is to store data corresponding to main data bus interface slots having a defective or absent computer sub-system.

Each module further comprises a comparator circuit which is part of the first bus interface, the purpose of which is to compare data on the main data bus with data on the shared data bus and generate state outputs in response thereto. A parity checking circuit is also part of the first bus interface and monitors data lines in the main data bus, generating a parity output which is used as an input to the comparator circuit.

A private data bus is connected to the shared data bus through a second bus interface. The private data bus is also connected to a plurality of hardware elements which may include a read/write memory, a read-only memory, and a "dirty" memory. The purpose of the "dirty" memory is to store data corresponding to memory locations in the read/write memory to which information has been written. As will become clear, this facilitates the copying of data from one central processing module to another. Also connected to the private data bus and controlling the operation of each central processing module is a central processing unit which operates in a substantially synchronized manner with central processing units in other central processing modules.

Finally, each central processing module contains a control logic circuit which is connected to and controls the first and second bus interfaces. The control logic circuit receives as its inputs the state outputs generated by the comparator circuits in every central processing module. The circuit, using these and other control signals described more specifically below, generates, among other things, control logic signals which indicate to the central processing unit whether a fault has occurred. If a fault is detected, each module then executes a routine which identifies the location of the fault, disables the failed module or sub-system, and then returns to the instruction being executed at the time the fault was detected.

Embodiments of this invention will now be described by way of examples only and with reference to the accompanying drawings.

DESCRIPTION OF THE SPECIFIC EMBODIMENTS

Figure 1:
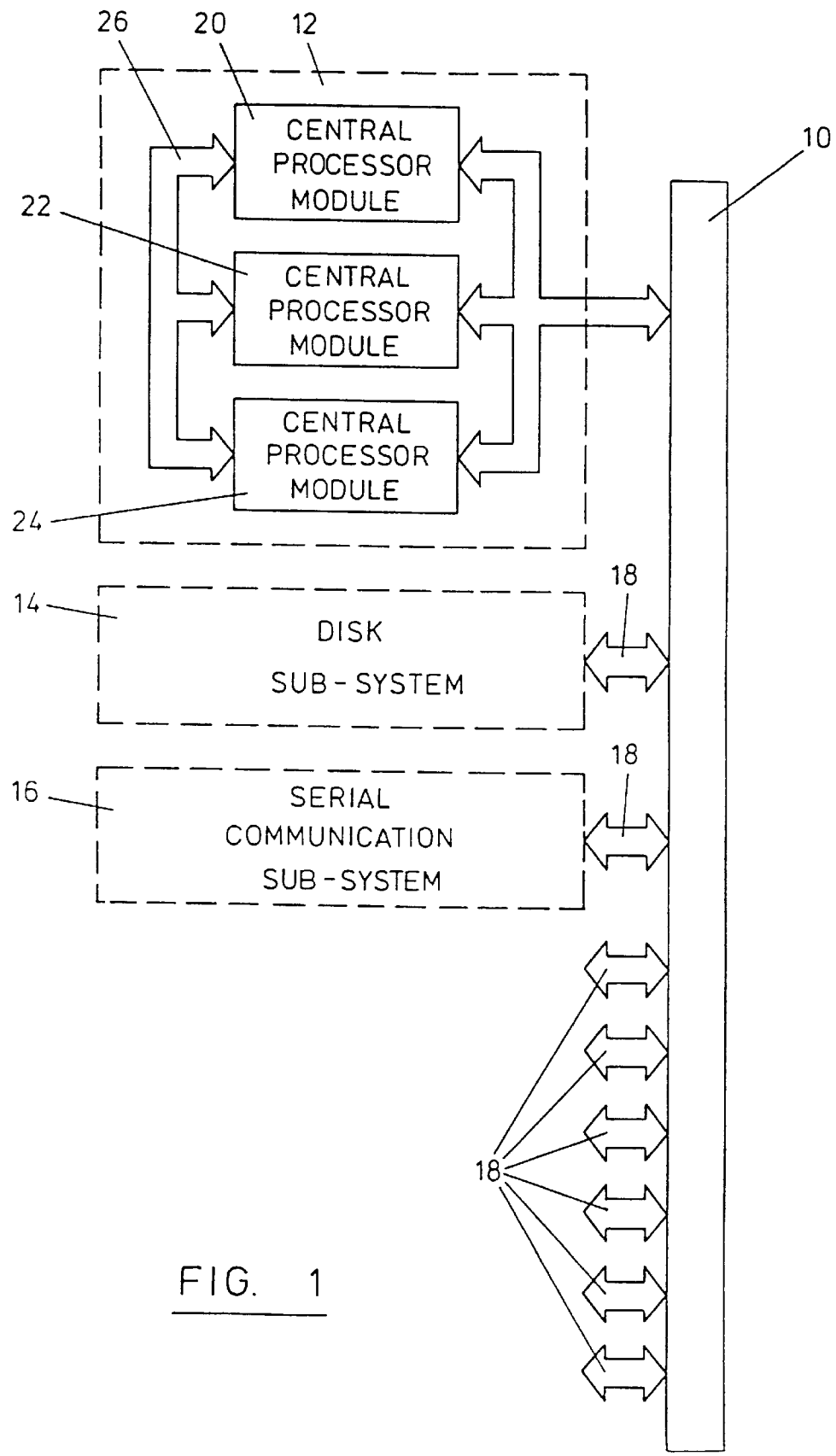
FIG. 1 is a block diagram of part of a computer system in accordance with this invention.

The computer system illustrated in FIG. 1 consists of three sub-systems, inter-connected by a data transfer bus 10. The three sub-systems are: a central processor sub-system 12; a magnetic disk sub-system 14 for the storage of data; and a serial communications sub-system 16. It should be understood that this configuration is intended only as an example; the central processor sub-system 12 must be present in every case, but the number and type of the other sub-systems may vary considerably. The connection between each sub-system (except the processor sub-system 12) and the data transfer bus 10 is provided via a "slot" on the data transfer bus; the bus 10 has a total of eight slots (18 in FIG. 1), so it can accommodate up to eight sub-systems, in addition to the processor sub-system 12.

The sub-systems which are connected via the slots 18 may be entirely conventional, provided that they interface correctly to the data transfer bus 10; for this reason, the disk sub-system 14 and the communications sub-systems 16 are not further described.

As FIG. 1 shows, the central processor sub-system 12 comprises three identical central processor modules 20, 22, 24; from now on these processor modules will be referred to as 'cpusets'. The data transfer bus 10 provides the main interconnection between the cpusets 20, 22, 24, but there is also a synchronization bus 26 which inter-connects the three cpusets. The synchronization bus 26 has no connection to any part of the computer outside the processor sub-system 12.

Figure 2:
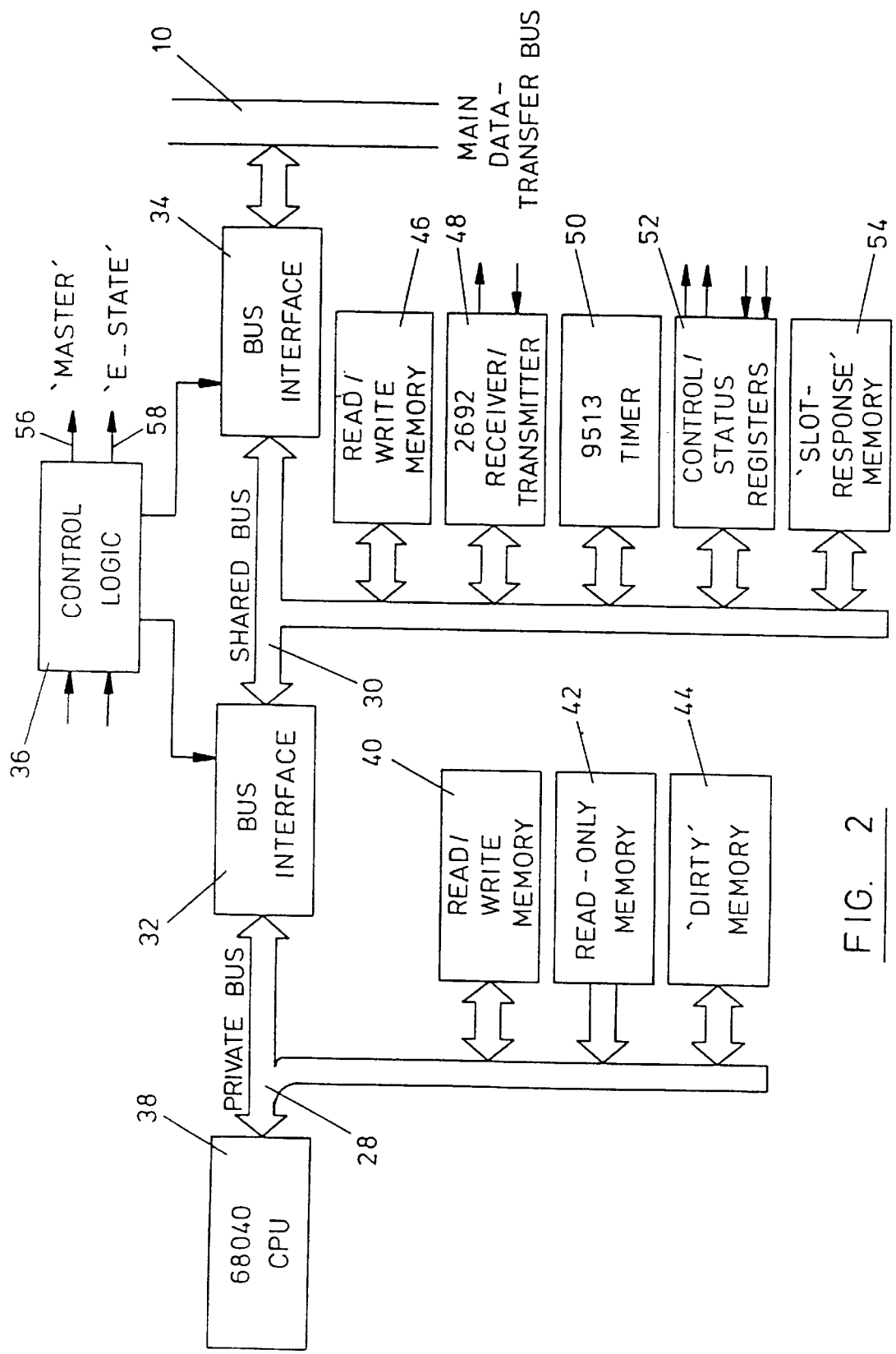
FIG. 2 is a more detailed block diagram, illustrating a central processor module which forms part of FIG. 1.

FIG. 2 is a more detailed block diagram of one of the cpuset 20, 22 or 24 (all three are identical). Within the cpuset, there are two data transfer busses: a private bus 28, and a shared bus 30. A bus interface 32 is connected to both of these busses, so that data transfer between the two busses is possible. A further bus interface 34 is connected both to the shared bus 30 and to the main data transfer bus 10 of the computer. A control logic circuit block 36 is connected to both the bus interfaces 32 and 34, to control the operation of these interfaces. In general terms, the use of a private-bus/shared-bus architecture is conventional in the design of the central processor part of a computer; however, the details of the structure and operation of the bus interface 34 are novel. Explanation of these details requires a preliminary explanation of the way in which the cpusets 20, 22 and 24 cooperate during normal operation of the computer.

Each cpuset has a central processing unit 38 (from now on referred to as the CPU 38), which is connected directly to the private bus 28. In this example, the CPU is a single Motorola 68040 integrated circuit, but other types of CPU could equally well be used. Other hardware elements which are connected to the private bus 28 include a private read/write memory 40, a private read-only memory (PROM) 42, and a special-purpose read/write memory 44; any data transfers between the CPU 38 and one of the memories 40, 42, and 44 will always be confined to the private bus 28. The read/write memory 40 and the read-only memory 42 are conventional and will not be described in detail. A later part of this description provides details about the construction and use of the special-purpose memory 44; for reasons which will become clear from that later description, the memory 44 is called the 'dirty' memory.

The use of the three cpusets 20, 22 and 24 provides 'Triple Modular Redundancy' or TMR; in other words, a defect occurring in one of the cpusets can be detected by comparing the behavior of the three cpusets. During normal operation, all three cpusets 20, 22 and 24 will have exactly the same memory contents (in their memories 40, 42 and 44), and will execute the same instructions from their memory, inclose synchronism with one another. If the only data transfers required by these instructions are transfers between the CPUs 38 and the memories 40, 42 and 44 (on the same cpuset as the CPU 38 executing the transfer), then there is no interaction between the cpusets via the main data transfer bus 10.

This is also true if the instructions being executed by the CPUs 38 require a data transfer which passes through the bus interface 32, but not through the bus interface 34; in other words, a data transfer between the CPU 38 and any hardware element connected to the shared bus 30. As FIG. 2 shows, each cpuset 20, 22 or 24 has the following five hardware elements connected to its shared bus 30: a shared read/write memory 46; an asynchronous receiver/transmitter circuit 48 (consisting of a 2692 integrated circuit), which provides an RS-232 interface, allowing a computer terminal to be connected directly to the cpuset; a timer circuit 50 (consisting of a 9513 integrated circuit); a group of control and status registers 52 (described later in more detail); and a special-purpose read/write memory 54 (also described later in more detail; for reasons which will become clear later, the memory 54 is called the 'slot-response memory'). As with the memories 40, 42 and 44, all the hardware elements connected to the shared bus 30 will have exactly the same status on all three of the cpusets 20, 22 and 24, during normal operation of the computer.

All other instructions executed by the CPUs 38 will involve both the bus interfaces 32 and 34 in tandem; for example, such instructions might require the CPU 38 to attempt to transfer data to or from the disk sub-system 14. The control logic circuit block 36 has two signal lines whose state is especially important in controlling the behavior of the bus interface 34 during the attempted data transfer; these are a 'master' line 56, and an 'e_state' signal line 58. At any given moment, each of the cpusets 20, 22 and 24 will be in one of three states, which are defined by logic levels on the two signal lines 56 and 58 of that cpuset, as shown by the following table:

| 'master signal' (line 56) | 'e_state' signal (line 58) | State of the cpuset |
| --- | --- | --- |
| Logic '1' | Logic '0' | 'Master' state |
| Logic '0' | Logic '0' | 'Checker' state |
| Any logic level | Logic '1' | 'Error' state |

During normal operation of the computer, one of the three cpusets 20, 22 and 24 will be in the 'master' state, as defined by the levels on the lines 56 and 58; the other two will be in the 'checker' state. None of the cpusets will be in the 'error' state, unless a fault has occurred.

If a cpuset is in the 'master' state, and its CPU 38 encounters an instruction requiring data transfer to or from the disk sub-system 14 (for example), the bus interface 34 for that cpuset will drive address and control signals on to the main data transfer bus 10 in a generally conventional manner, to perform the data transfer. While this transfer is taking place, the other two cpusets of the processor sub-system (assuming that both are in the 'checker' state) should have exactly the same signals on their private and shared busses 28 and 30 as on the corresponding busses of the 'master' cpuset; but the bus interfaces 34 of the 'checker' cpusets do not pass the address and control signals through to the main data transfer bus 10. Instead, the bus interface 34 on each cpuset merely compares the signals on the shared bus 30 (of that cpuset) with the signals on the main data transfer bus. An exactly similar checking operation is also performed by the 'master' cpuset. If no difference is detected by any of these comparisons, the central processor sub-system 12 is assumed to be healthy, and operation of the computer continues normally. What happens in the event of a difference being detected is explained later; however, it may be mentioned here that one of the results of such a difference is that the 'e_state' signal lines 58 on the cpusets will change to a logic '1' level, meaning that all three cpusets are (for the time being) in the 'error' state.

If a cpuset is in the 'error' state, its control logic 36 does not permit its CPU 28 to perform any data transfers via its bus interface 34. However, the bus interface 34 of a cpuset in the 'error state' can operate as a 'slave' device on the main data transfer bus 10; in other words, another cpuset which is in the 'master' state can transfer data to or from any of the hardware elements connected to the shared bus 30 of the cpuset in the 'error' state.

The foregoing description is no more than a summary of the co-operation between the three cpusets 20, 22 and 24. A number of important details remain to be explained, with reference to FIGS. 3 to 6. The control logic block 36 (one forming part of each cpuset) appears in all these figures except the state-transition diagram of FIG. 4). This logic block has the task of coordinating the operation of many other parts of the cpuset; it consists mainly of a programmable Array of Logic (PAL), whose behavior is most easily described by a set of Boolean equations, defining the relationships between input and output signals. The following description of each part of the cpuset explicitly mention only those input and output signals that relate to the relevant part of the cpuset; at the end of this description, the full set of equations is listed, giving a complete definition of the behavior of the logic block 36.

Figure 3A:
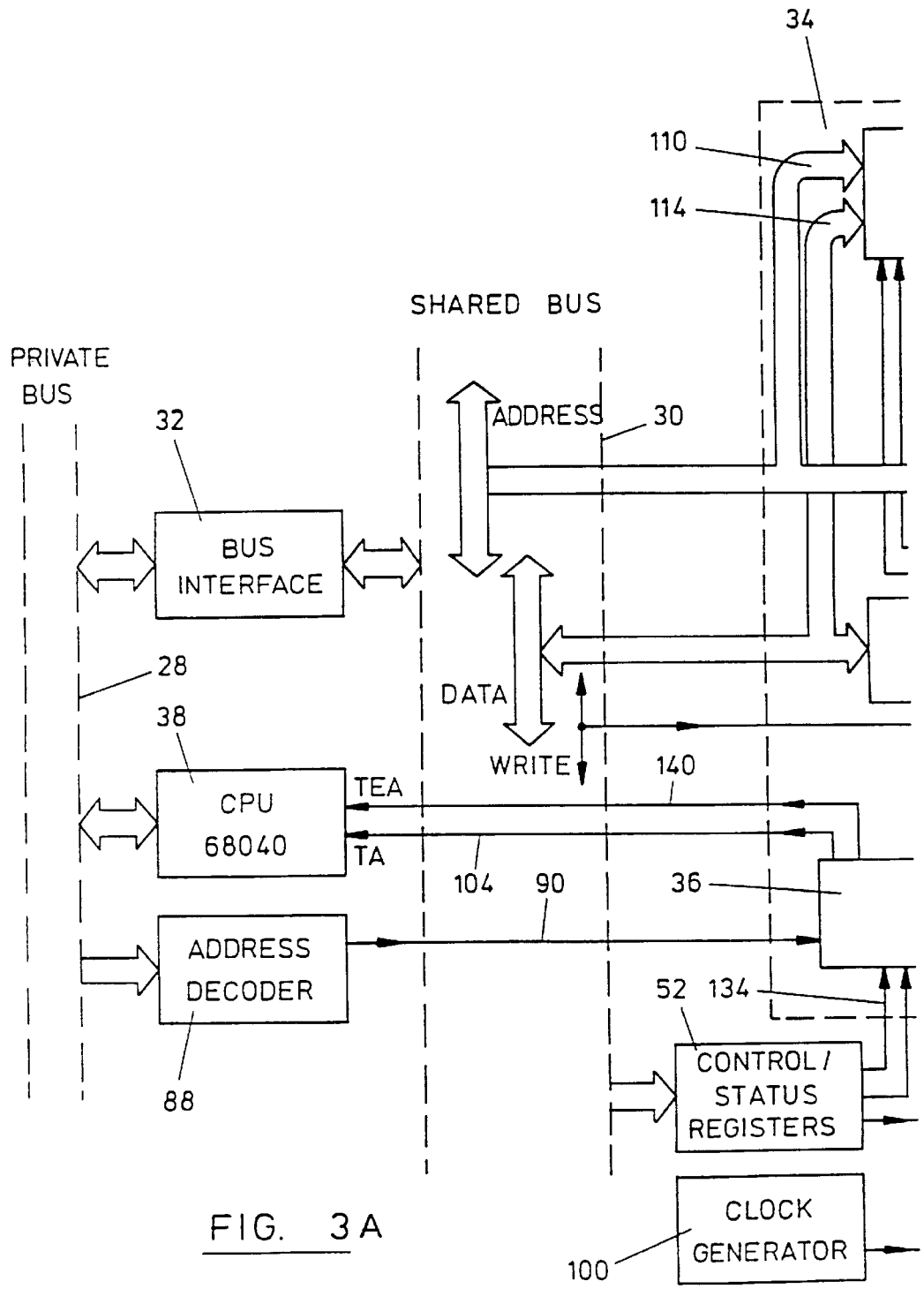
FIG. 3 is a still more detailed block diagram, illustrating the operation of a bus interface which forms part of the processor module of FIG. 2.
Figure 3B:
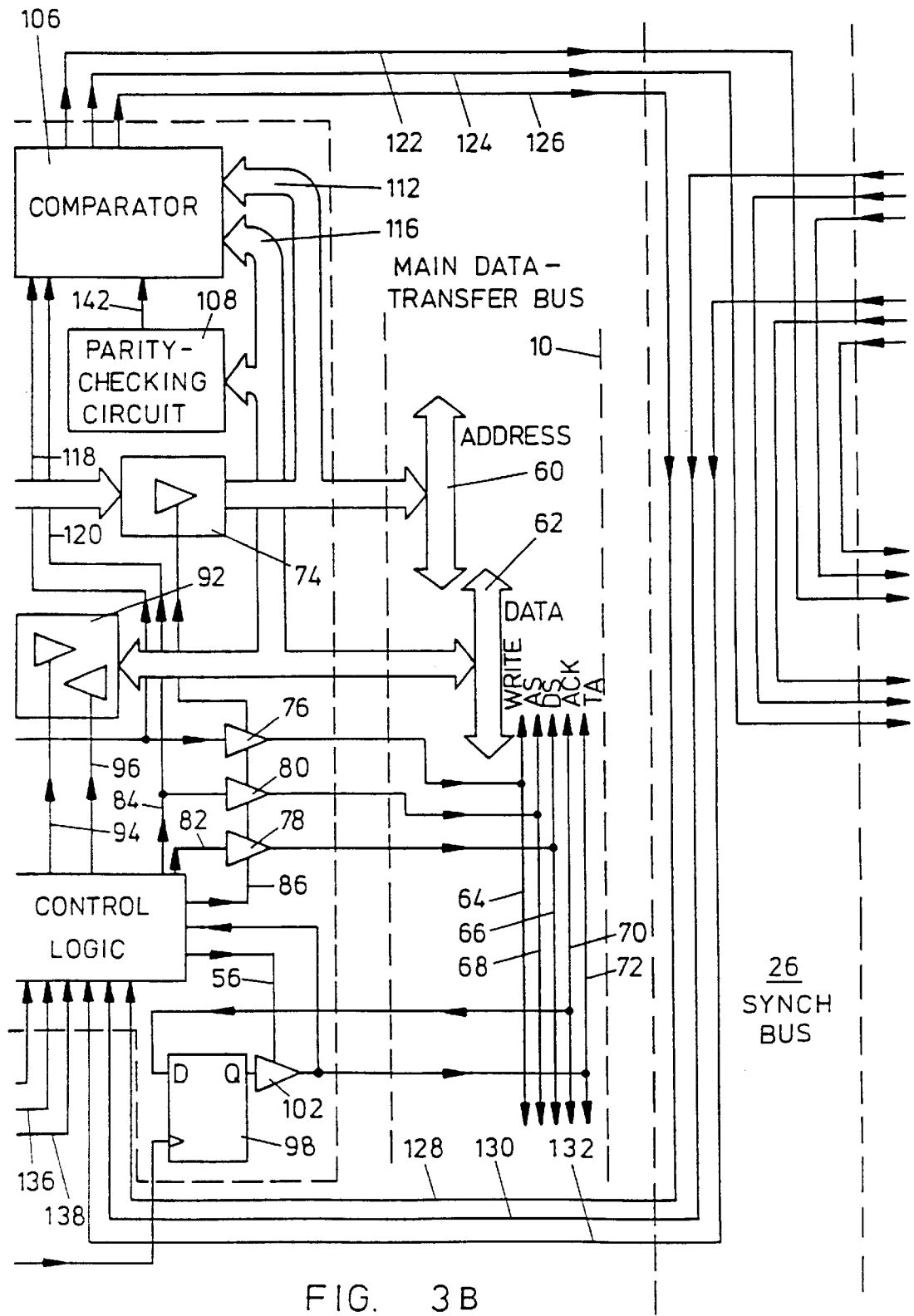

FIG. 3 illustrates the behavior of the bus interface 34 of a cpuset 20, 22 or 24, when the cpuset is in the 'master' state. As FIG. 3 shows, the main data transfer bus includes a group of address lines 60, a group of data lines 62, and a group of control lines, namely a WRITE line 64, a data-strobe (DS) line 66, an address-strobe (AS) line 68, an asynchronous transfer-acknowledge (ACK) line 70, and a synchronous transfer-acknowledge (TA) line 72. The bus interface 34 includes buffers 74, 76, 78 and 80 whose outputs are connected to the address, WRITE, DS and AS lines respectively; the inputs of the buffers 74 and 76 are connected to the corresponding signal lines in the shared bus 30, while the inputs of the buffers 78 and 80 are connected to two output signal lines 82 and 84 from the logic block 36. The logic equations, the signals on the lines 82 and 84 and 'tb_ds' and 'tb_as' respectively. The buffers 74, 76, 78 and 80 also all have 'enable' inputs, which are connected to a further output signal line 86 from the logic block 36. In the logic equations, the signal on line 86 is 'to_buse_a'; this signal will be asserted every time a cpuset in the 'master' state executes an instruction requiring use of the bus interface 34. To recognize these instructions, the cpuset includes a private address decoder 88, connected to the private bus 28; whenever the address on the private bus falls within a predetermined range, allocated for accesses to the main data transfer bus 10, the decoder activates an output signal on a line 90, which is connected to an input of the logic block 36. In the logic equations for the block 36, this signal is 'bus'.

The bus interface 34 also includes a set of bi-directional buffers 92 which interconnect the data lines 62 of the main data transfer bus, and the corresponding lines of the shared bus 30. The buffers 92 have two 'enable' inputs, one for each direction of data transfer; these two inputs are connected to two further output signal lines 94 and 96 from the logic block 36. In the logic equations, the signal on line 94 (enabling data transfer from the shared bus 30 to the main bus 10) is 'to_buse_d', while the signal on line 96 (enabling data transfer in the opposite direction is 'from_buse_d'. One (and only one) of the lines 94, 96 will be asserted if the 'bus' signal on line 90 becomes active.

The controlling equations incorporated in the control logic 36 cause the enabling of data transfers towards the main bus 10 on 'write' instructions, and towards the shared bus 30 in 'read' instructions, except for one special case. This special case arises because the CPU 38 of a cpuset can access the hardware elements connected to its shared bus 30 in either of two ways, depending on the address used for the access:

(i) a purely internal access, which does not activate the signal 'bus' on line 90, and therefore does not involve the bus interface 34; or (ii) a self-referential access via the bus interface 34; this means that the address used for the access falls within the range which causes the 'bus' signal on line 90 to become active.

In case (ii), the line 94 (for 'to_buse_d') will always become active, irrespective of whether the data transfer direction is 'read' or 'write'. This is because, for either transfer direction, the source of the data (either the CPU 38, or one of the hardware elements connected to the shared bus 30) will lie on the shared-bus side of the bus interface 34.

This means that, by activating the line 94, the control logic 36 will ensure that the data being transferred also appears on the data lines 62 of the main data transfer bus 10. This in turn permits the 'checker' cpusets access to this data. In the case of a 'write' data transfer, all that a 'checker' cpuset has to do with this data is to compare it with the data on its own shared bus 30. In the case of a 'read' data transfer, however, a 'checker' cpuset actually has to read in the data;

in other words, all cpusets (except any in the 'error' state) will read in the same data, and so their internal states should remain exactly in step.

A data transfer over the main data bus 10 will be signalled by an active level on the DS and AS lines 66 and 68. Assuming that the data transfer proceeds normally, one of the sub-systems connected to the slots 18 (or one of the cpusets 20, 22, 24) will then signal completion of the data transfer, by activating the asynchronous transfer-acknowledge (ACK) line 70. On each cpuset, the line 70 is connected to the D (data) input of a D-type flip-flop 98, which has its clock input connected to a clock signal derived from a clock generator circuit 100. The clock circuit 100 is responsible for all clock signals generated on the cpuset, and (during normal operation of the computer) the clock circuits 100 on all three cpusets 20, 22 and 24 run in close synchronism. The Q output of the flip-flop 98 is connected to the input of a buffer 102, whose output is connected to the synchronous transfer-acknowledge (TA) line 72; the buffer 102 also has an 'enable' input which is connected to the 'master' line 56, so that only the 'master' cpuset will drive the TA line 72. The TA line 72 is connected to an input of the control logic 36, as well as to the buffer 102 and the main bus 10; in the equations defining the control logic, the signal from the TA line is 'rsb_ta'. Again assuming that the data transfer proceeds normally, the effect of the signal from the TA line is to cause the data transfer to terminate, by causing the control logic 36 to activate an output line 104, which is connected to the CPU 38. The line 104 corresponds to the 'u_ta' term in the logic equations, and is connected to the 'transfer-acknowledge' pin of the CPU 38 (this pin name on the CPU 38 assumes that the CPU is a Motorola 68040).

The reason for using the flip-flop 98 to synchronize the transfer-acknowledge signal is that the asynchronous signal on line 70 can change state at any arbitrary moment in relation to events on the cpusets, so that, if this signal were allowed directly to influence the behavior of more than one of the cpusets, it could not be guaranteed that operation of the cpusets would continue exactly in step. To illustrate this point, consider the case where the asynchronous signal is sampled simultaneously by all the cpusets; if the signal were to change state exactly at the moment when it is being sampled, it might be seen as a logic '1' on one cpuset, but as a logic '0' on the other cpusets, and this would lead to the cpusets getting out of step. The synchronous signal TA provided by the flip-flop 98, on the other hand, can only change state at certain moments in relation to the clock signals on the 'master' cpuset. The clock signals on the 'checker' cpusets run in close synchronism with the signals on the 'master' cpuset, so it is impossible to guarantee that the activation of signal TA will occur at a moment when none of the cpusets is actually clocking in (sampling) the signal; the next clocking of the signal can then be guaranteed to occur while the signal is not actually changing, so that all cpusets clock in the same logic level, and continue their instruction execution in total synchronism.

The foregoing description of the events which occur during a data transfer involving the bus interface 34 assumes that no abnormal behavior occurs. However, during any such data transfer, the 'master' cpuset also monitors the validity of the information on the main data transfer bus 10. The hardware required to perform this monitoring is shown in FIG. 3; it includes a comparator circuit 106, and also a parity-checking circuit 108.

The comparator circuit 106 performs two distinct stages of checking during an attempted data transfer. These stages can best be explained with reference to FIG. 4, which is a state-transition-diagram illustrating the behavior of part of the control logic block 36. (In the logic equations defining the logic 36, the corresponding equations are the definitions of seven states S0 through S6, and the Boolean equations defining the logic terms which enter into these state definitions.)

Figure 4:
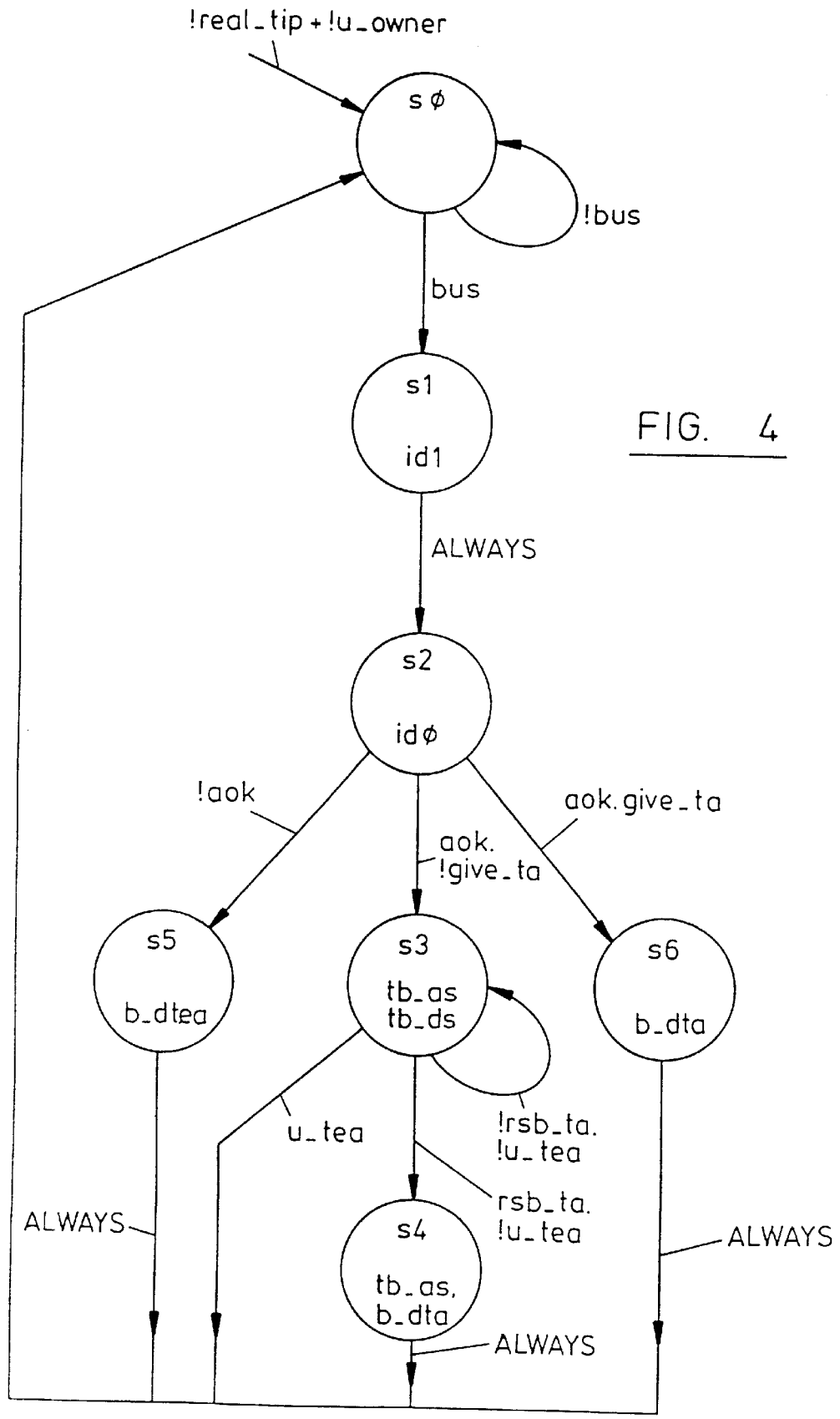
FIG. 4 is a state-transition diagram, illustrating the operation of the bus interface shown in FIG. 3.

In the state diagram of FIG. 4, the state S0 is the 'idle' state, defining the state of the associated logic terms when no data transfer is taking place via the bus interface 34. Any data transfer involving the bus interface 34 is initiated by the signal 'bus' from the address decoder 88. In the state diagram of FIG. 4, this signal causes a transition from state S0 to state S1, and then to state S2. At the same time, the signal 'bus' also causes the address and data buffers 74 and 92 in the bus interface to be enabled, as already described. The first stage of checking by the comparator circuit 106 then takes place. Note that the control logic 36 has not yet activated the signals 'tb_as' and 'tb_ds'.

The comparator circuit 106 has four groups of input lines: two of these groups 110 and 112 are connected to the address lines in the shared bus 30 and the main data transfer bus 10 respectively, while the remaining two groups of lines 114 and 116 are similarly connected to the data lines in the two busses. Within the comparator circuit 106, there are two separate comparators (not explicitly shown in the figures); one comparator compares the signals on the lines 110 and 112, while the other compares the signals on the lines 114 and 116. The comparator also has two further input lines 118 and 120, which are connected to the 'write' line in the shared bus 30, and to the 'tb_as' address-strobe signal (output from the control logic 36). Within the comparator circuit. 106, the lines 118 and 120 and the outputs from the two comparators are gated together by combinatorial logic (also not explicitly shown in FIG. 3), to provide an output on three output lines 122, 124 and 126, which provide signals indicating whether the comparator 106 considers that the conditions on the main data transfer bus 10 agree with the conditions on the shared bus 30. These three output signals are logically identical, and are distributed via the synchronization bus 26 to the three cpusets 20, 22 and 24; FIG. 3 illustrates this distribution of signals. As this figure shows, each cpuset also has three input signal lines 128, 130 and 132 connected to the synchronization bus; the interconnections in the synchronization bus ensure that these lines are each connected to the output of the comparator circuit 106 on a different one of the three cpusets. The signal lines 128, 130 and 132 are connected to inputs of the control logic block 36; in the logic equations, the signals on these lines are 'bus_ok0', 'bus_ok1' and 'bus_ok2'.

The first stage of checking by the comparator circuit 106 takes place as follows. The comparator 106 identifies that this is the first stage of the check, by the fact that the 'tb_as' signal (received from the control logic 36 via the lines 84 and 120) is not yet active. It compares signals received form the address lines of the two busses via its input lines 110 and 112; also, if the 'write' line of the shared bus 30 indicates a 'write' cycle, the comparator compares the signals received from the data lines of the busses via its input lines 114 and 116. If this comparison (or comparisons, in the case of a 'write' cycle) reveal no discrepancy, then the comparator will generate a 'bus_ok' signal on each of its three output signal lines 122, 124 and 126.

For the data transfer to proceed normally, the control logic block 36 on the 'master' cpuset must receive 'bus_ok' signals from its own comparator circuit 106, and also from whichever of the other two cpusets it believes to be in the 'checker' state (the behavior of a cpuset in the 'checker' state will be described later); it ignores any 'bus_ok' signal from a cpuset that it believes to be in the 'error' state. Referring to the logic equation, this masking of signals from a cpuset in the 'error' state is shown by the equation defining the logic term. 'aok'; as well as the three 'bus_ok' signals, this logic term depends on three signals 'signif0', 'signif1' and 'signif2', which are received by the control logic 36 via three lines 134, 136 and 138 from the control and status registers 52 (connected to the shared bus 30). So long as the computer is operating normally, all three lines 134, 136 and 138 will carry a logic '1' level, indicating that this cpuset believes all three cpusets to be able to provide a significant 'bus_ok' signal; but if the 'master' cpuset should change its belief, it can (under software control) modify the signals on one or more of the lines 134, 136 and 138, by writing data to the control and status registers 52.

Assuming that the 'master' cpuset receives 'bus_ok' signals from all cpusets which are currently believed to be significant, the 'aok' term in the logic equations will now be active. It will be recalled that the control logic block 36 has so far reached the state S2 in the state-transition diagram of FIG. 4. From this state, an active 'aok' signal allows the state to change to state S3, in which state the output lines 82 and 84 of the control logic block 36 (corresponding to the logic terms 'tb_ds' and 'tb_as') become active. These active signals propagate through the buffers 78 and 80 to reach the data-strobe and address-strobe lines 66 and 68 of the main data transfer bus 10, thereby initiating a data transfer on this bus.

In an alternative case, where one (or more) of the expected 'bus_ok' signals fails to become active, the logic term 'aok' will remain inactive, and the control logic block 36 will instead change from state S2 to state S5. The definition of state S5 shows that the logic term 'b_dtea' will be true in this state, and this term in turn affects the logic term 'u_tea'. The control logic block 36 has an output line 140 which depends directly on the 'u_tea' term; this line 140 is connected to the 'transfer-error-acknowledge' pin of the CPU 38 (again, this pin name assumes that the CPU 38 is a Motorola 68040). The CPU 38 will respond to an active level on this pin by aborting the current data transfer cycle, and entering an exception-handler routine in its controlling software.

The logic term 'b_dtea' also causes the 'e_state' output signal line 58 to become active, putting the cpuset into its 'error' state, so that the computer is temporarily without a 'master' cpuset. All cpusets in the computer (with the exception of those which were already in the 'error' state) should now be in the 'error' state, and executing their exception-handler routines. The actions performed by this exception-handler routine should be sufficient to identify which of the three 'bus_ok' signals failed to become active, and from this and other information, should cause one of the cpusets to change back to the 'master' state. The hardware which permits this change to be made under software control will be described later. Other parts of the software exception-handler may be concerned with actions which are needed to ensure that the data transfer which was being attempted when the 'b_dtea' signal became active can be successfully completed on a second attempt. For example, one action which is needed is to write to the control and status register 52, to change the 'signif' signals.

When execution of the exception-handler has been completed, the 'master' cpuset (which is not necessarily the same cpuset as the one which previously was master) will return to executing the same instruction that it was executing when the 'b_dtea' signal became active. Because of the actions taken by the exception-handler software, it can be expected that this instruction can be successfully executed on the second attempt. In other words, apart from the slight delay caused by the exception-handling, the software (whether this is operating system software of application software) will appear to run without interruption, despite the fact that the hardware has suffered some kind of problem.

Returning to the description of the comparator circuit 106 and the state-transition diagram of FIG. 4, if the control logic 36 successfully reaches state S3, it will then wait for the TA signal on line 72 to become active. This signal indicates that the cpuset's request for a data transfer (indicated by the address-strobe and data-strobe signals) has been acknowledged; this acknowledgement may come from any of the sub-systems 14 or 16 (or cpusets 20, 22 or 24), depending on the address information on the address lines 60 of the main data transfer bus 10. When this acknowledgement is received, the control logic 36 changes from state S3 to state S4, and the second stage of checking by the comparator circuit then takes place, as follows.

When the control logic 36 is in state S4, the logic term 'b_dta' becomes active. In the case of a 'write' cycle this unconditionally causes the logic term 'u_ta' to become active, and so the signal line 104 connected to the CPU 38 becomes active, causing a normal termination of the data transfer. In the case of a 'read' cycle, the logic term 'b_dta' will also cause 'u_ta' to become active, provided that the 'bus_ok' signals (received from the comparator circuits 106 on the input signal lines 128, 130 and 132) are all active (apart from cpusets believed to be in the 'error' state); if not, the logic term 'u_tea' will become active in preference to the term 'u_ta'; so that the signal line 140 to the 'transfer-error-acknowledge' pin of the CPU 38 becomes active, and initiates exception-handling, as already described in connection with the first stage of the checking performed by the comparator circuit 106.

During the second stage of a 'read' data transfer cycle, no checking is performed by the comparators in the comparator circuit 106, but a check on the consistency of the data is performed by the parity-checking circuit 108, whose output is connected by a lines 142 to the comparator circuit 106. The 'bus_ok' signals on the output lines 122, 124 and 126 of the comparator circuit 106 will be activated only if no parity error is detected; so, if a parity error should occur on any of the 'master' and 'checker' cpusets, exception-handling will be initiated, as described above.

It will be clear from this that all the sub-systems connected to the slots 18 must include parity-generating circuits, so that (in the absence of any hardware problems) there will be no parity-error on the data lines 62 of the bus 10 during a 'read' data transfer.

After the control logic block 36 has reached state S4 during a data transfer involving the main data transfer bus 10, it will change automatically back to the 'idle' state S0, thereby bringing both the data-strobe and address-strobe lines 66 and 68 of the bus back to their inactive state.

There are two other ways in which a data transfer involving the bus 10 can terminate. These will be explained later.

Figure 5A:
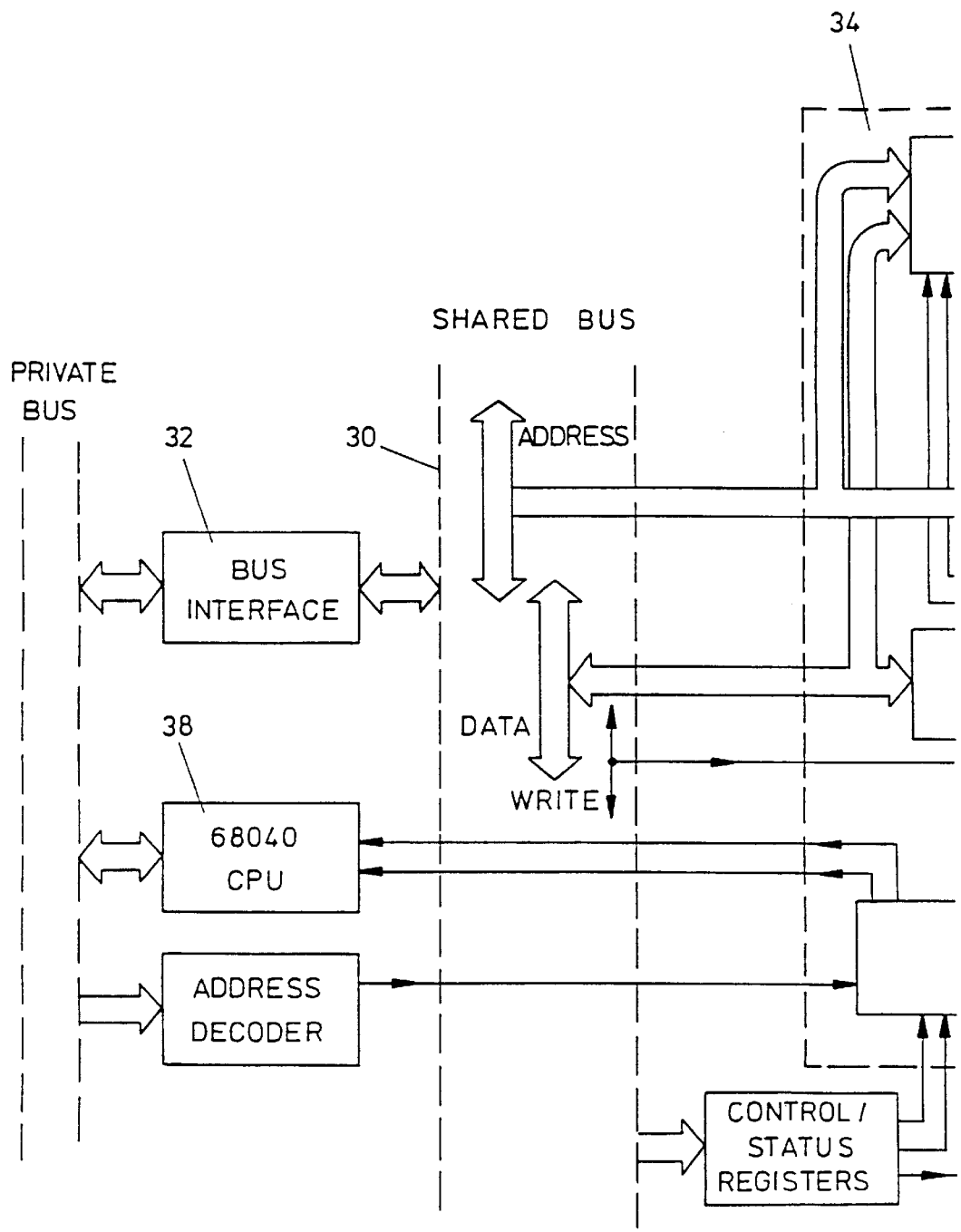
FIG. 5 is a similar diagram to FIG. 3, but illustrates a different mode of operation of the bus interface.
Figure 5B:
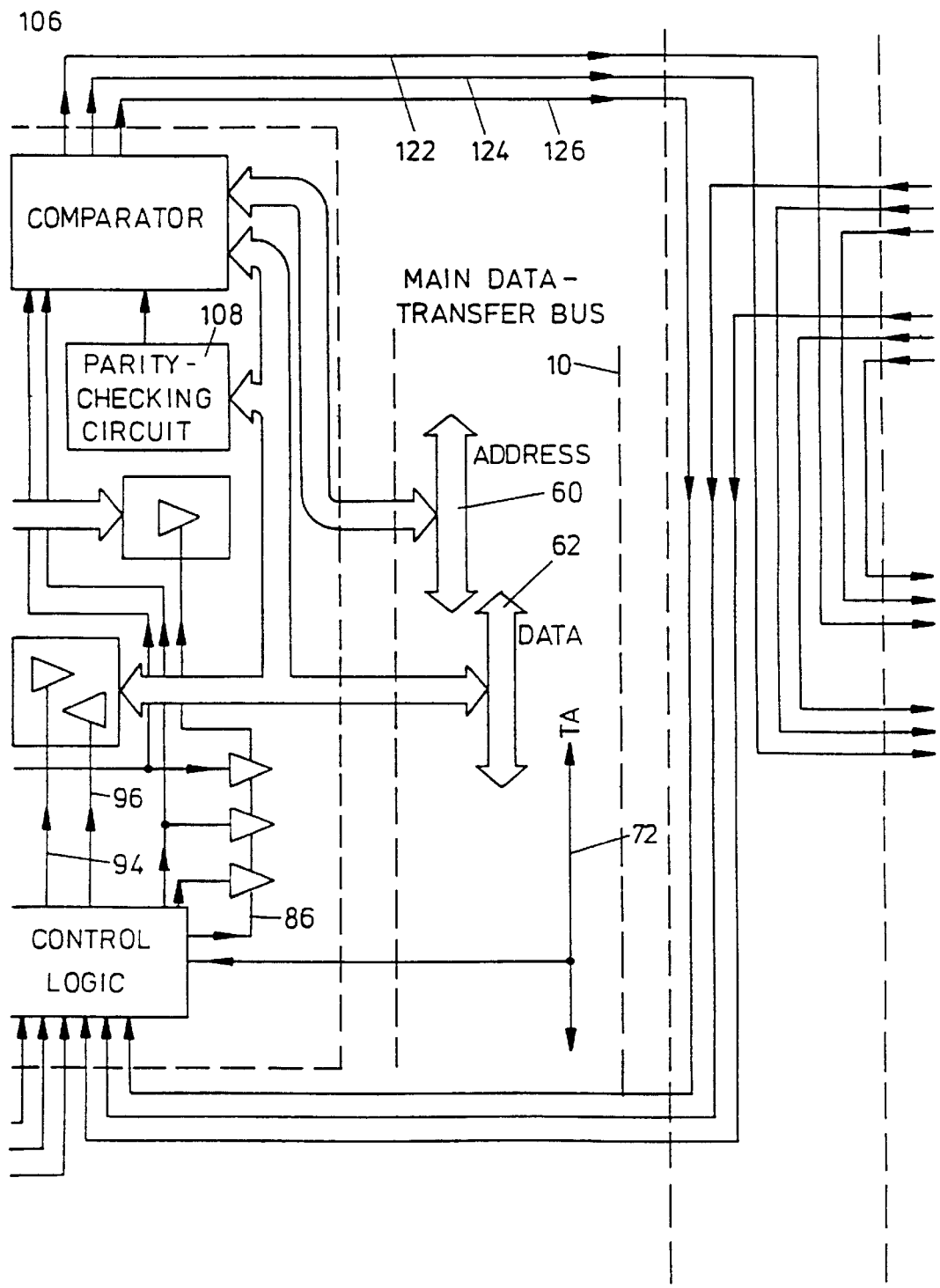

The next part of this description deals with the behavior of any cpuset which is in the 'checker' state. FIG. 5 is similar to FIG. 3, but shows only those parts of the bus interface 34 which are active on a 'checker' cpuset. The behavior of such a cpuset is in many ways similar to the behavior of the 'master' cpuset, and so the following description will concentrate first on the differences between 'master' and 'checker' behavior. It should be remembered that the CPU's 38 of 'master' and 'checker' cpusets will be executing exactly the same instructions, in close synchronism.

The first difference in behavior between a 'master' and a 'checker' cpuset is that the signal on the line 86 (representing the term 'to_buse_a' in the logic equations) never becomes active on a 'checker' cpuset. This means that a 'checker' cpuset will never attempt to drive the address, WRITe, DS and AS lines 60, 64, 66, and 68 of the main data transfer bus 10. However, since the 'master' and 'checker' cpusets should be operating in close synchronism, the conditions which are driven on to these lines by the 'master' cpuset should exactly match the conditions on the corresponding lines of the shared bus 30 of each 'checker' cpuset. This match is checked by the comparator circuit 106. The operation of the comparator circuit is exactly the same on a 'checker' cpuset as on a 'master' cpuset; if a mismatch is detected by the comparator circuit 106 of a 'checker' cpuset, exactly the same sequence of events takes place as was described above for the 'master' cpuset.

The second difference in behavior between a 'master' and a 'checker' cpuset is that the signal on the line 94 (representing the term 'to_buse_d' in the logic equations) does not become active on a 'checker' cpuset when a 'write' cycle is being executed. In other words, the 'checker' cpuset does not drive the data lines 62 on the main data transfer bus 10; but, as with the address lines 60, the comparator circuit 106 will compare the conditions driven on to the data lines of the bus 10 with the conditions on the data lines of the shared bus 30 of the 'checker' cpuset. Again, the sequence of events resulting from a mismatch is exactly the same as already described for the 'master' cpuset.

When a 'checker' cpuset attempts a 'read' data transfer, the behavior of the two signal lines 94 and 96 (which correspond to the terms 'to_buse_d' and 'from_buse_d' in the logic equations) is unchanged from the behavior which was described above for the 'master' cpuset. This ensures that (in the absence of any hardware faults) the same data will be present on the data lines 62 of the main data transfer bus 10 and on the data lines of the shared busses 30 of all 'master' and 'checker' cpusets. It is necessary for the same data to be made available to all these cpusets, in order that the content of their read/write memories 40 (and any other parts of the cpuset whose status depends on incoming data) remain exactly the same, to ensure that cpuset operation continues in synchronism.

For most 'read' data transfers, the signal line 96 (corresponding to the logic term 'from_buse_d') will be active on each 'checker' cpuset, so that the bi-directional data buffers 92 are enabled to transmit data from the main data transfer bus 10 to the shared bus 30 of the cpuset. However, if the address which is placed on the main data transfer bus by the 'master' cpuset indicates that the CPU 38 wants to read data from one of the 'checker' cpusets, the signal line 94 (corresponding to the logic term 'to_buse_d') will instead be activated (but only on that 'checker' cpuset which has to supply the data). This type of data transfer is analogous to the self-referential accesses mentioned above in respect of the 'master' cpuset operation, but with the difference that the source of the data is on the 'checker' cpuset rather than on the 'master' cpuset.

During any 'read' data transfer involving the main data transfer bus 10, the comparator circuit 106 and the parity-checking circuit 108 on each 'checker' cpuset operate in exactly the same way as described above for the 'master' cpuset. In other words, all 'master' and 'checker' cpusets in the computer must receive the data without any parity error; if not, the cpuset detecting a parity error will not activate its 'bus_ok' signals on lines 122, 124 and 126, and all 'master' and 'checker' cpusets will then simultaneously change to the 'error' state and begin exception handling.

Figure 6:
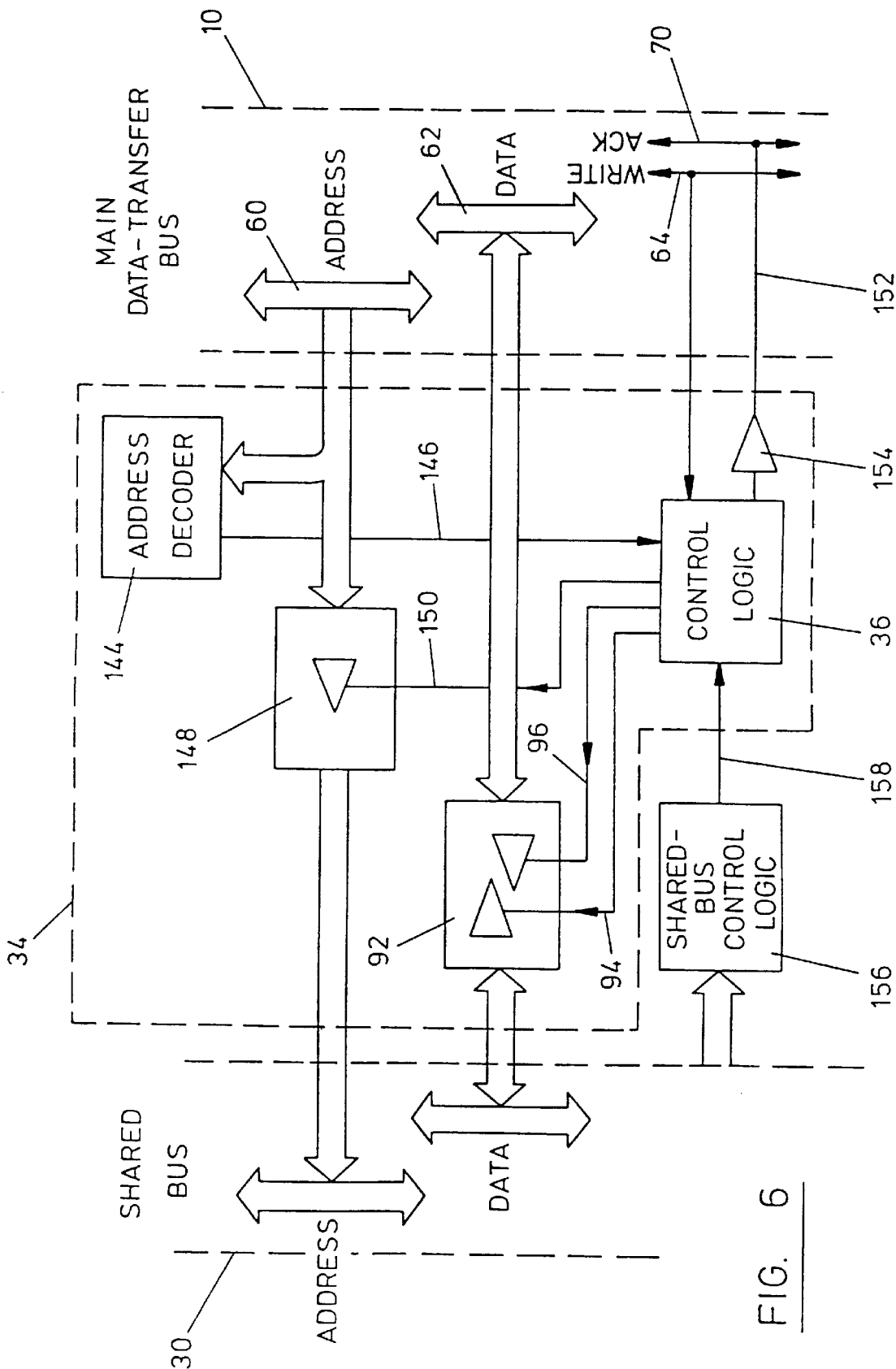
FIG. 6 is a block diagram, illustrating a 'slave' mode of operation of the bus interface of FIGS. 3 and 5.

As already mentioned, a cpuset in the 'error' state cannot execute any data transfers over the main data transfer bus 10, but it can participate as a 'slave' in a data transfer being executed by the 'master' cpuset. FIG. 6 shows the parts of the bus interface 34 which are active during such a data transfer, on the cpuset which is in the 'error' state. Some of the parts which are shown in FIG. 6 are also involved in the self-referential data transfers which have already been described.

The bus interface 34 of each cpuset includes an address decoder 144, connected to the address lines 60 of the main data transfer bus 10. The decoder has an output signal line 146 which is connected to an input of the control logic block 36; the signal on this line appears in the logic equations as 'address_match', and indicates that the address placed on the bus 10 by the 'master' cpuset during a data transfer identifies this transfer as a transfer to or from the cpuset containing the decoder 144. The signal generated on the line 146 by the decoder 144 has this meaning, whether the cpuset containing the decoder is in the 'master', 'checker' or 'error' state.

The bus interface 34 also includes a group of address buffers 148, which have their inputs connected to the address lines 60 of the main data transfer bus, and their outputs connected to the shared bus 30 of the cpuset (in other words, these buffers operate in the opposite direction to the address buffers 74 which appear in FIG. 3, illustrating operation of the 'master' cpuset). The buffers 148 also have an 'enable' input, connected via a signal line 150 to an output of the control logic block 36; this line corresponds to the term 'from_buse_a' in the logic equations. When a cpuset is in the 'error' state, and participates as a 'slave' in a data transfer, the control logic activates the signal line 150 to enable the buffers 148, so that the address information on the main data transfer bus 10 is available on the shared bus 30, to identify which of the various items connected to the shared bus 30 should participate in the data transfer.

Referring to the logic equations describing the operation of the control logic block 36, the effect of the signal 'address-match' from the decoder 144 is to cause the terms 'bus_access' and 'bus_reply' to become true. In the case of a cpuset which is in the 'error' state, the term 'bus_owner' also becomes true; the logic equations defining this term and the term 'u_owner' effectively define an arbitration mechanism which allocates ownership of the shared bus 30 either to the CPU 38 (indicated by the 'u_owner' term being true) or to the bus interface 34 (indicated by the 'bus_owner' term being true).

In the case of a cpuset which is in the 'error' state, the changes just described will influence the bus interface 34 via four output signal lines of the control logic 36. Three of these are the lines 150, 94 and 96 (representing the logic terms 'from_buse_a', 'to_buse_d' and 'from_buse_d'). The first of these lines controls the address buffers 148, as just described. The second and third lines 94 and 96 control the bi-directional data buffers 92; which of these two lines is made active depends on a signal 'rbus_write', which is received by the control logic 36 from the WRITE line 64 in the main data transfer bus 10. The remaining output signal line from the control logic 36 that is affected by a change in the 'bus_owner' and 'bus_reply' terms is a line 152 which is connected, via a buffer 154, to the asynchronous transfer-acknowledge line 70 (ACK) of the main data transfer bus 10. The signal output on the line 152 represents the term 'tbus_ta' in the logic equations; for any data transfer which was initiated by the output line 146 from the decoder 144 becoming active, activation of the term 'tbus_ta' will not occur until a control logic block 156 associated with the shared bus 30 and the hardware elements connected to that bus signals that the data transfer can be completed. More specifically, the logic block 156 has an output signal line 158 which is connected to an input of the logic block 36; the control logic 156 will activate the signal on this line 158 as soon as the transfer can be completed, and this signal is received by the control logic 36 as the input term 'p_ta'. Reference to the logic equation for the term 'tbus_ta' shows that activation of this term will not occur until the input 'p_ta' become true.

It should also be noted that the input 'p_ta' will cause activation of the term 'tbus_ta' only if the bus interface 34 has ownership of the shared bus 30 (which is the case when a cpuset in the 'error' state participates in a data transfer as 'slave'). If instead the CPU 38 has ownership of the shared bus 30, the input 'p_ta' will cause activation of the 'u_ta' output from the control logic 36, so that in this case a transfer-acknowledge signal is sent to the CPU 38 on the signal line 104.

Figure 7:
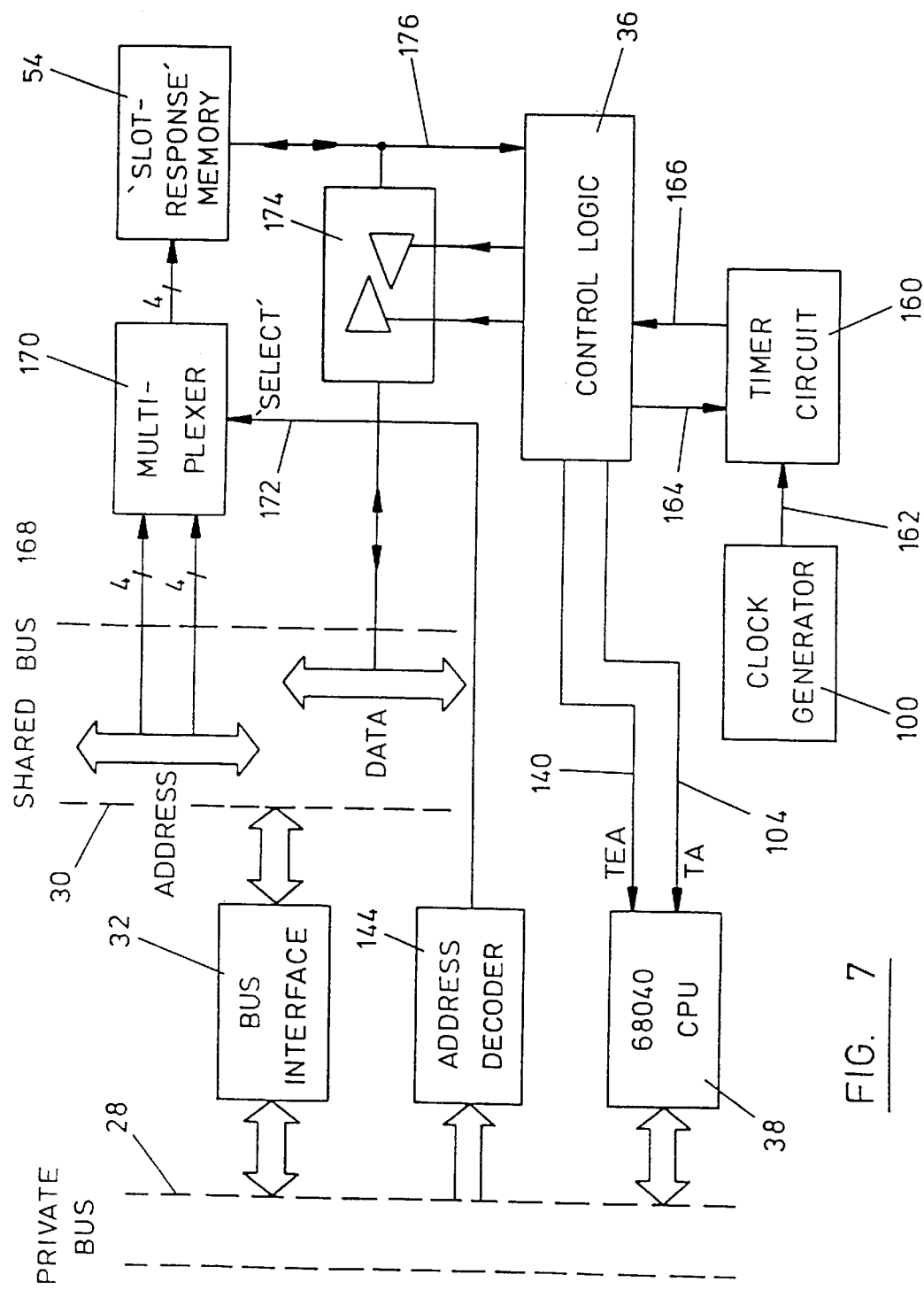
FIG. 7 is a block diagram, illustrating a time-out circuit and a special-purpose memory which form part of the central processor module of FIG. 2.

As previously mentioned, there are two further ways in which a data transfer may be terminated, in addition to the sequences described above. The first of these alternative ways for a transfer to terminate is a time-out, which will occur if no transfer-acknowledge signal is received by the 'master' cpuset. To implement this time-out, and referring to FIG. 7, each cpuset 20, 22 and 24 has a timer circuit 160, which has a clock input line 162, a reset input line 164, and a time-out output line 166. The clock input line 162 is connected to the clock circuit 100, to receive a steady clock signal (typically, with a period of 1 microsecond). The reset input line 164 is connected to an output of the control logic block 36; this output corresponds to the logic term 'real_tip', but with a logical inversion, so that the timer circuit 160 is brought back to a reset state whenever the CPU 38 is not in the middle of a data transfer. The time-out output line 166 of the timer 160 is connected to the control logic block 36 as the input logic term 'timeout_tea'; reference to the logic equations will show that this input term, if it should become active, will cause activation of the 'u_tea' term.

The timer circuit 160 typically has a time-out period of 128 microseconds. All normal data transfers executed by the CPU 38 will be completed in much less time than this, so the timer 160 will never normally activate its output line 166. However, if the CPU 38 tries to access a sub-system, such as the disk sub-system 14, which happens to be either missing or defective, it will not receive any transfer-acknowledgement signal on the main data transfer bus 10 and the control logic block 36 will remain in the state S3. This condition will persist until the timer circuit 160 times out and activates its output signal line 166. Because this signal is translated by the control logic into the 'u_tea' signal, which is applied to the 'transfer-error-acknowledge' pin of the CPU 38, the data transfer will be aborted, and control will pass to the same software exception-handler that was mentioned above, in connection with the operation of the comparator circuits 106.

The timer circuit 160 is conventional in principle; however, it should be noted that it is implemented as a digital timer, clocked from the same clock circuit 100 as the rest of the hardware of the cpuset; this is necessary to ensure that the timers 160 on the three cpusets 20, 22 and 24 stay strictly in step with one another.

The details of the software exception-handler obviously depend heavily on the type of CPU 38 that is used on the cpusets. In the present example, in which the CPU 38 is a Motorola 68040, it is virtually certain that the exception-handler will end with an RTE instruction (return from exception). The effect of this instruction is to restore the CPU's internal state to what it was before the data transfer was first attempted, and then to retry the data transfer. In the case where the attempted data transfer is to or from a sub-system that is missing or defective, this would lead to an infinite series of retries, if no other action were taken to cause the second transfer attempt to behave differently from the first. The 'slot-response memory' 54 (accessible via the shared bus 30 of the cpuset) is part of a hardware circuit whose purpose is to allow the CPU 38 to escape from the infinite series of retries.

The hardware associated with the 'slot-response memory' 54 includes eight address input lines 168 which are connected to the shared bus 30, but these address lines are not connected directly to the 'slot-response memory' itself. Instead, they are connected to inputs of a 4-bit multiplexer 170, whose outputs are connected to four address inputs of the memory 54. The multiplexer 170 also has a 'select' input line 172, which is connected to an output of the address decoder 144; the effect of the lines 172 is that, during any 'normal' data transfers to or from the slot-response memory 54, the 4-bit address applied to the memory 54 is derived from the four least-significant address liens of the shared bus 30, so that the memory 54 effectively occupies sixteen consecutive addresses. At all other times, the address applied to the memory 54 is derived from four high-order address lines of the shared bus 30, which are sufficient to uniquely identify which of the eight slots 18 and three cpusets 20, 22 24 is being accessed during a transfer over the main data transfer bus 10. The date input/output pin of the memory 54 (this memory has a data width of 1 bit only) is not directly connected to the shared bus 30, but is instead connected via a bi-directional buffer 174, which is only enabled when data is being read from the memory 54. This arrangement is necessary because the input/output pin of the memory 54 is enabled for output at all times except when data is being written to the memory. This input/output pin is connected via a signal line 176 to the control logic block 36; it appears in the logic equations as 'give_ta'.

The effect of this signal on the control logic 36 is as follows. When the CPU 38 attempts a data transfer which involves the main data transfer bus 10 (to or from one of the slots 18, or one of the other cpusets), the address applied to the slot-response memory 54 will identify which slot or cpuset is being accessed. If the data which appears on the line 176 in response to this address is '0', the logic term 'give_ta' in the logic equations of the control logic 36 will be false, and the data transfer will proceed exactly as already described above, terminating either with a transfer-acknowledge signal on the bus 10 or with a timeout signal from the timer circuit 160. However, if the data which appears on the line 176 is '1', the control logic 36 will exhibit different behavior; when it reaches state S2 in the state-transition diagram of FIG. 4, it will next pass to state S6, in which the 'b_dta' term is activated, even though the 'tb_as' and 'tb_ds' terms have never been activated to initiate a data transfer over the bus 10. Activation of the 'b_dta' term causes the data transfer to be terminated in a manner which is normal in the sense that no exception-handling is initiated; however, the software can detect the absence of any valid data on a 'read' transfer.

Typical usage of the 'slot-response memory' 54 would be as follows. During normal operation of the computer, any location of the memory 54 corresponding to a slot containing a correctly-functioning sub-system will contain '0' data, and the memory 54 will not interfere with data transfers on the main data transfer bus 10. However, if one of the sub-systems should become defective, or be removed from the computer, the next attempt to access that subsystem will result in the timer circuit 160 generating a timeout, followed by execution of the exception-handler. One of the actions taken by the exception-handler is to change the data in the corresponding location of the slot-response memory to '1', so that all subsequent attempts to access the defective or absent sub-system will result in an artificial termination of the data transfer attempt, without any timeout, and without any exception handling.

It will be clear from this description that any attempted data transfer which is terminated by the timer circuit 160 will last very much longer than a normal data transfer. While the computer is operating normally, this is of no consequence, because all data transfers will terminate normally; but it one of the sub-systems of the computer is absent or defective, repeated attempts to transfer data to or from that subsystem could have a serious impact on the performance of the computer, because of the delays resulting from repeated timeouts. It would in principle be possible to minimize this delay by means of a software mechanism, in which the exception-handler sets a software flag to indicate that the sub-system is absent or defective, and all other parts of the software that access the sub-system (in particular, the device driver for that sub-system) have to check the status of this flag at fairly frequent intervals, in the course of any data transfers of appreciable size. (Small data transfers could perhaps be allowed to proceed without this check, since the resulting delay would not be disastrous; but it would still represent a degradation of performance.) This use of a software flag is not a particularly desirable scheme, because it makes it difficult to incorporate standard device drivers into the system software. The use of the 'slot-response-memory' 54, on the other hand, makes it possible for a device driver to attempt large data transfers to or from a sub-system, without incurring the danger of a possible long series of timeouts, and without any need to make special checks in the course of the transfer. After the transfer has been completed, a simple check of the 'slot-response-memory' 54 will reveal whether the transfer was successful.

The clock circuits 100 (one on each of the three cpusets 20, 22 and 24) each supply all the timing signals required by the other parts of that cpuset. The three clock circuits 100 are inter-connected by the synchronization bus 26, in order to keep the timing signals on the three cpusets closely in step. Some details on the construction and operation of the clock circuits 100 and the synchronization bus 26 will now be described, with reference to FIGS. 8 and 9.

In addition to the nine lines of the synchronization bus 26 which have already been mentioned (carrying the 'bus_ok' signals), the bus 26 has six lines concerned with the clock circuits 100: three lines 178, 180 and 182 which carry signals indicating whether or not each of the cpusets 20, 22 and 24 is powered-on; and three lines 184, 186 and 188 which (at least during normal operation) carry identical clock signals, one for use by each of the cpusets. The line 178 may be regarded as being paired with the line 184, since they are both closely associated with the cpuset 20 (one indicating the powered-on status of the cpuset, while the other supplies a clock signal to that cpuset). Similarly, the line 180 is paired with the line 186, and the line 182 is paired with the line 188.

Taking the line 178 as an example, it is connected via a pull-up resistor 190 (which forms part of the synchronization bus 26) to a +5 volt power supply line 192; it is also connected via a transistor 194 (which forms part of the cpuset 20) to a 0 volt (ground) line 196. During normal operation of the cpuset 20, the transistor 194 will provide a low resistance path to ground, so that the line 178 will be at a logic '0' level. However, if the cpuset 20 were to be removed from the computer system, or if the cpuset were to suffer some kind of failure which meant that it no longer receives the power required for it to operate, the transistor 194 would no longer provide the low resistance path to ground, and the line 178 would now be pulled-up by the resistor 190 to a logic '1' level. In a similar manner, the lines 180 and 182 are connected to resistors 198 and 200 in the synchronization bus 26, and to transistors 202 and 204 in the cpusets 22 and 24 respectively, so that a logic '0' level on each of these lines indicates that the corresponding cpuset 22 or 24 is still present and powered up in the system.

As already explained, during normal operation of the computer, the three cpusets 20, 22 and 24 will run in close synchronism. This synchronism is maintained by the three lines 184, 186 and 188 of the synchronization bus; these three lines will normally carry identical clock signals, for use by the three cpusets 20, 22 and 24 respectively.

To drive the lines 184, 186 and 188, each cpuset has three clock buffers 206, whose signal inputs are all connected to the output of a crystal-controlled oscillator 208. Each of the clock buffers 206 also has an 'enable' input, which is connected to the output of one of three two-input AND gates 210; one input of each of these AND gates is connected (with a logical inversion) to one of the lines 178, 180 or 182 of the synchronization bus, while the other input is connected via a signal line 212 to the 'master' signal line 56 (one of the outputs of the control logic block 36). This means that, for any given clock buffer 206 to be enabled, the following conditions must both be fulfilled:

(i) The clock buffer must be on the cpuset 20, 22 or 24 which is currently the 'master' cpuset (this avoids any possibility that two clock buffers on different cpusets will simultaneously try to drive the same clock line 184, 186 or 188); and (ii) Whichever of the lines 178, 180 and 182 is paired with the clock line being driven by the clock buffer must be at a logic '0' level, indicating that the cpuset which receives the clock signal from the clock line is present and powered-up. This arrangement avoids the situation where the clock lines is being driven, but the circuitry which receives the clock signal from this clock line is not powered-up; this would be an undesirable situation, because the receiving circuitry may present a low impedance in its unpowered state, and the resulting current that would be driven through the circuitry by the clock buffer 206 might be sufficient to cause damage.

Figure 8A:
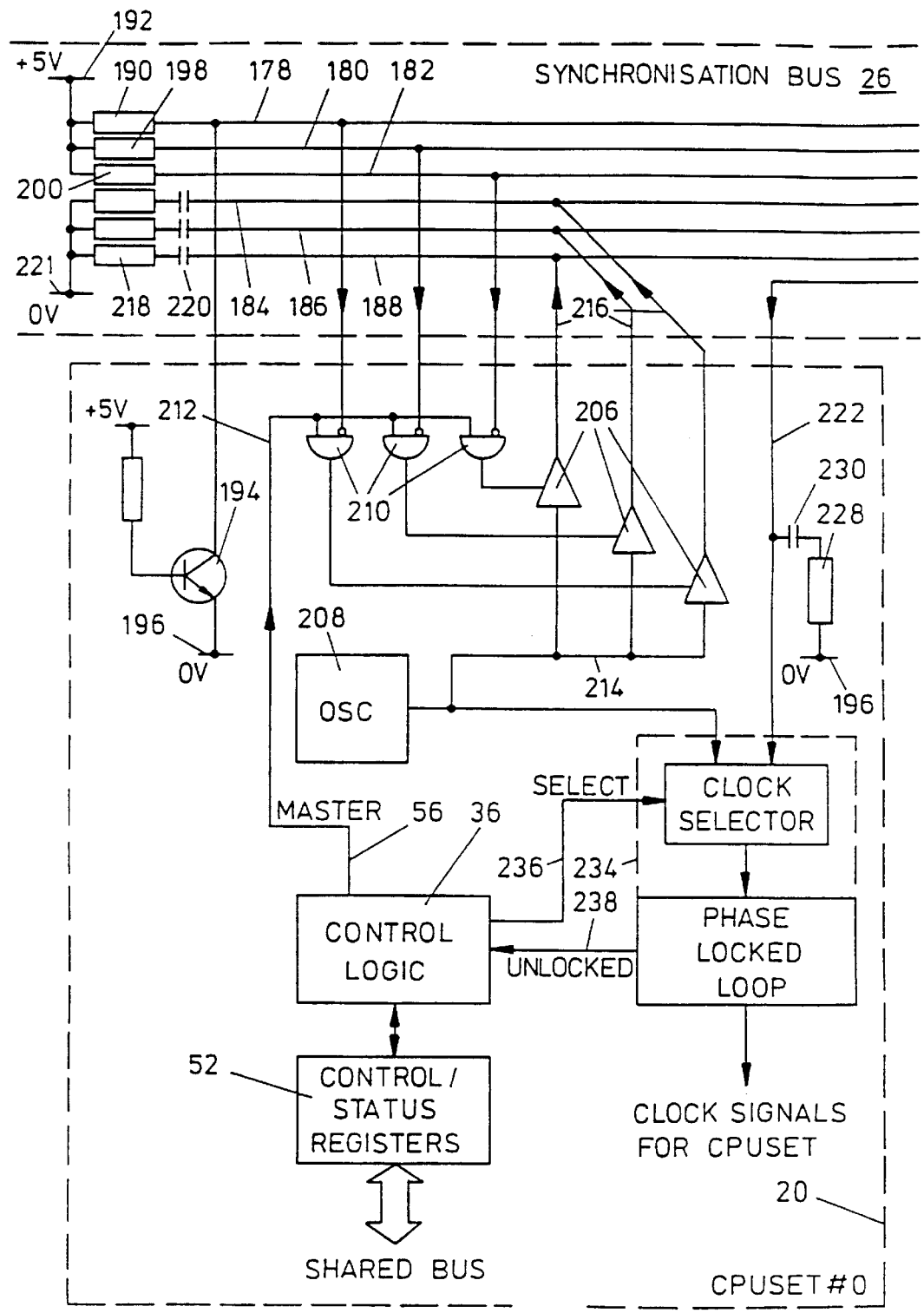
FIG. 8 is a block diagram, illustrating a clock generation circuit of the central processor module of FIG. 2.
Figure 8B:
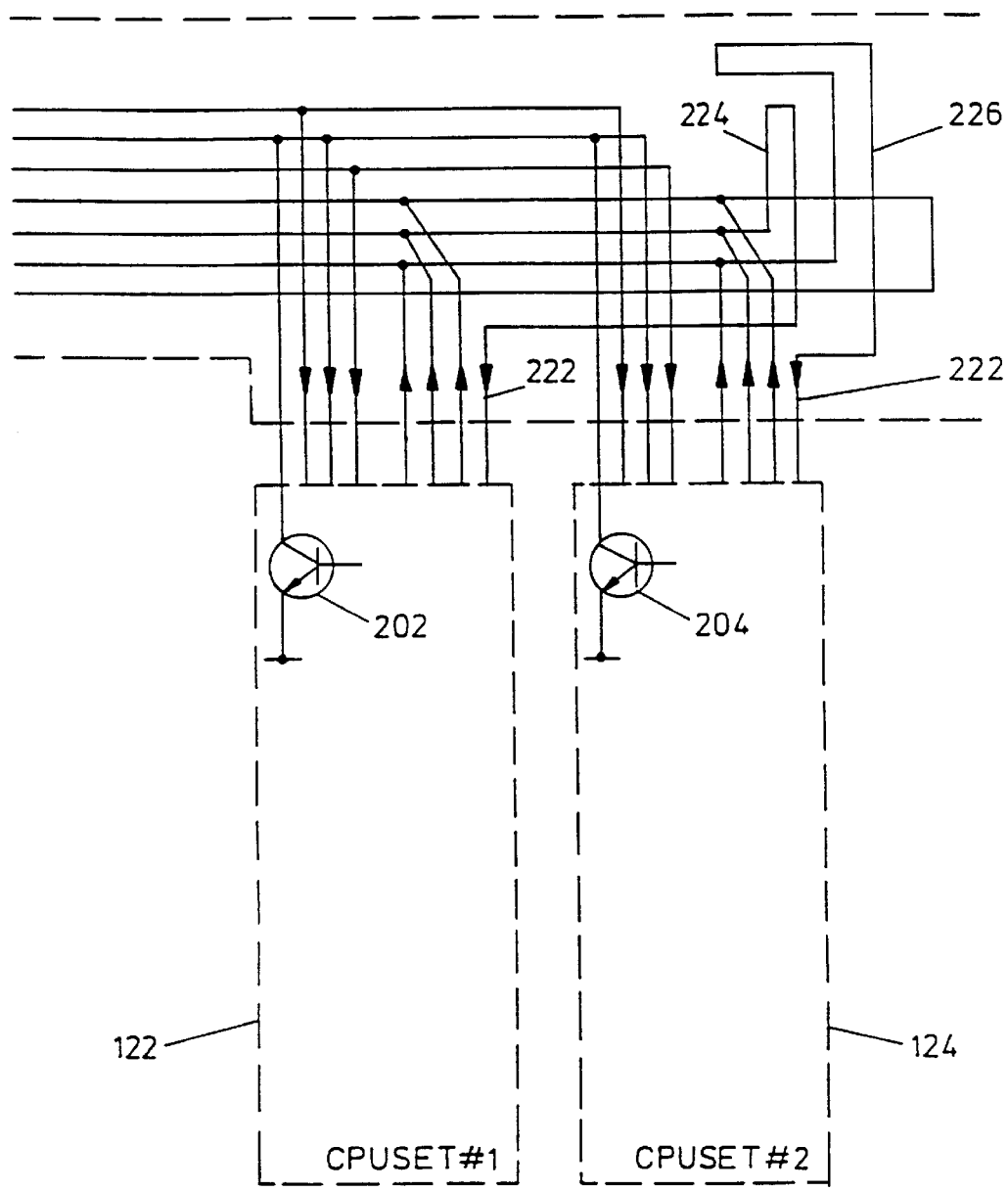

The clock circuits illustrated by FIG. 8 are designed to minimize the amount of skew that can arise between the clock signals received by the three cpusets; this is necessary because an excessive skew could result in the comparator circuits 106 signalling a mismatch between the operation of the cpusets. There are several design features associated with the clock circuits that help to minimize the skew. When reading the following description of these features, it should be remembered that the various cpuset modules 20, 22 and 24 may come from different production batches. This is relevant because one of the possible design techniques for minimizing skew is to specify that similar components in different signal propagation paths should be from the same production batch, in order that their characteristics should be closely matched. In the present case, this technique can only be applied to cases where the components to be matched are all on the same cpuset module.

The design features which help to minimize skew between the clock signals are:

First, the number of stages through which the three clock signals are separately buffered before reaching the synchronization bus 25 is kept to a minimum (namely, the single stage of buffering provided by the buffers 206).

Second, the signal inputs to the clock buffers 206 are connected to their common signal source (the oscillator 208) by a branched line 214, whose three branches have substantially equal lengths, measured from the oscillator to the clock buffers.

Third, the clock buffers 206 are all of the same type, and all three buffers 206 on any given cpuset are taken from the same production batch.

Fourth, the outputs of the clock buffers 206 are connected to the lines 184, 186 and 188 of the synchronization bus 26 by three lines 216 whose lengths (measured from the buffer outputs to the interface between the cpuset and the synchronization bus) are substantially equal.

Fifth, the lines 184, 186 and 188 in the synchronization bus 26 are also made as nearly as possible equal in length, measured from the points where the lines 216 inject the clock signals pass from the synchronization bus back into the cpusets. This equality in length is diagrammatically illustrated in FIG. 8; it is also illustrated by FIG. 9, which shows how the synchronization bus is implemented on a printed-circuit board.

Figure 9:
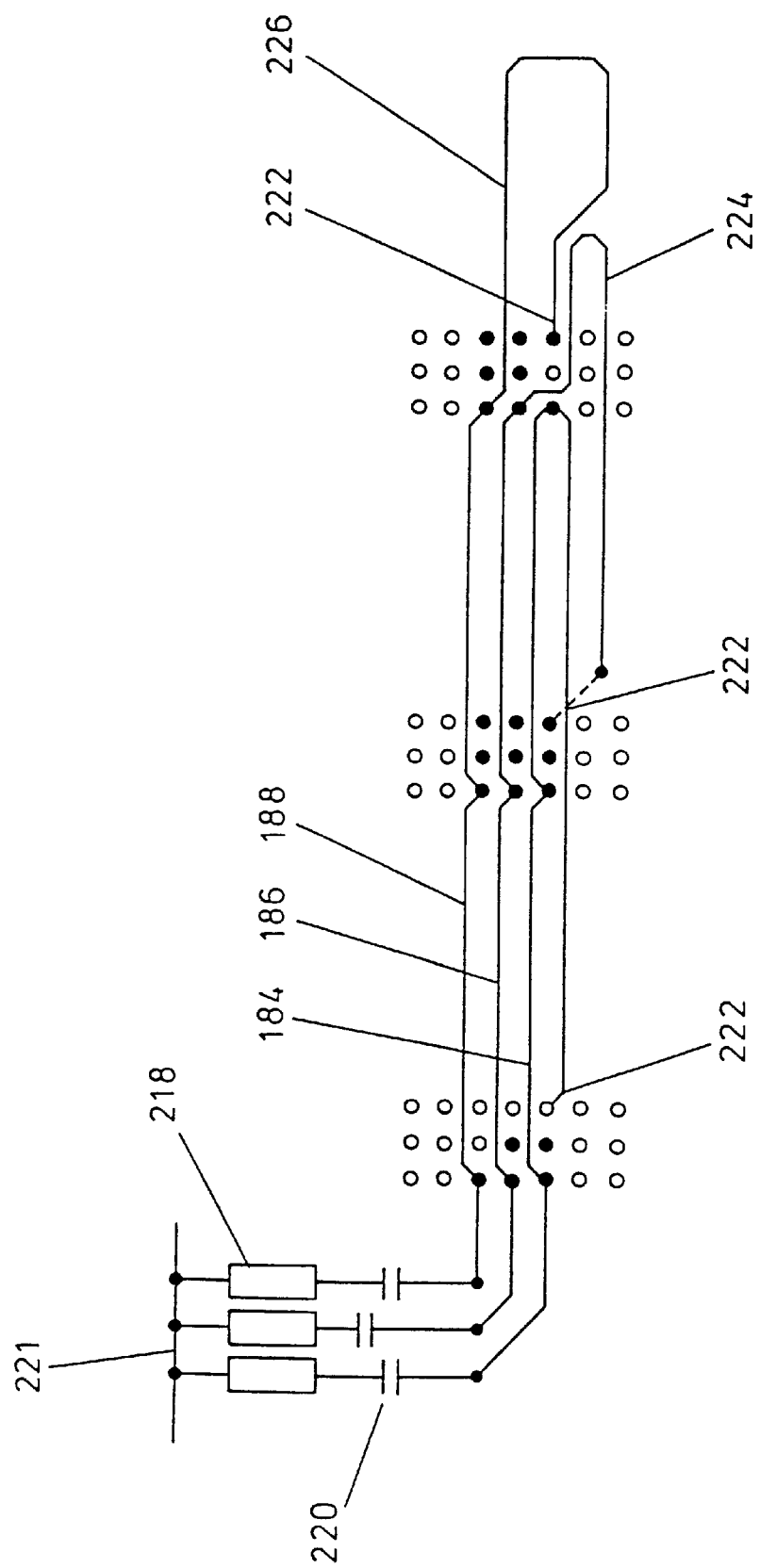
FIG. 9 shows a printed circuit layout which is used in a synchronization bus interconnecting the clock generation circuits of the central processor modules.

As FIGS. 8 and 9 show, each of the clock lines 184, 186 and 188 in the synchronization bus actually has three points where clock signals may be injected by the clock buffers 206, but the circuitry already described ensures that, at any given moment, only the 'master' cpuset will in fact be injecting clock signals into these lines. The three points where the clock signals are injected are all at the same point along the length of the lines. The clock signals where are injected will then propagate in both directions along the synchronization bus.

The left-hand ends (as seen in FIGS. 8 and 9) of the clock lines 184, 186 and 188 are each connected to a termination network forming part of the synchronization bus, and consisting of a resistor 218 and a capacitor 220 in series, connected between the clock line and a 0 volt (ground) line 221 in the bus 26. The value of the resistors 218 is chosen to match the characteristic impedance of the clock lines 184, 185 and 188, so that the clock signals propagating leftwards from the injection points are not reflected back towards the injection points. (Note that this is true, irrespective of which of the three cpusets is injecting the clock signals, and irrespective of the presence or absence of the other two cpusets in the computer).

The branch lines 216 may disturb the reflectionless propagation of the clock signals in lines 184, 186 and 188; therefore the lines 216 are kept short, to minimize this disturbance.

At the right-hand side of FIGS. 8 and 9, it can be seen that the three clock liens 184, 186 and 188 of the synchronization bus are looped around, and each connected to a clock input line 222 of its associated cpuset. These looped parts of the clock lines do not follow the shortest possible path to reach the clock input liens 222; instead, they are so designed that equal lengths of line have to be traversed by the clock signals, from the injection points to the points where the signals pass the clock input lines 222 of the three cpusets.

For the line 184, carrying the clock signal for the leftmost cpuset 20, the line loops back more or less directly to that cpuset, from the injection point where it can be driven by the rightmost cpuset 24. The line 186, carrying the clock signal for the middle cpuset 22, includes a hairpin loop 224 as an artificial means of increasing the length of line from the rightmost injection points to the middle cpuset; and the line 188 includes an even longer loop 226 between the rightmost injection points and the clock input line 222 of the rightmost cpuset 24.

The effect of making these line lengths equal is that the clock signals which propagate rightwards from the injection points will have exactly the same propagation time to reach the clock input lines 222 of their respective cpusets 200, 22 and 24.

On each cpuset, the clock input line 222 is connected to a terminating network, consisting of a resistor 228 and a capacitor 230 in series, connected between the line 222 and the 0 volt (ground) line 196. As with the resistor 218, the value of the resistor 228 is matched to the characteristic impedance of the line, to prevent reflections from occurring.

The line 222 is also connected, without any buffering, to a reference-signal input of a phase-locked-loop (PLL) implemented using a Motorola MC88915 integrated circuit). The PLL circuit also has a second reference-signal input, and a 'select' input which indicates which of the two reference-signals it should listen to. The second reference-signal input is connected to the line 214 carrying the output of the crystal-controlled oscillator 208, while the 'select' input of the PLL 234 is connected by a line 236 to an output of the control, logic block 36; this output corresponds to the term 'use_backplane_clock' in the logic equations.

The reason for not providing any buffering between the synchronization bus 26 and the reference-signal input of the PLL 234 is that, if such buffering were provided, the buffer components would almost certainly come from different production batches, and would therefore exhibit variations in propagation delay (unless components with exceptionally tightly specified characteristics were used). The PLLs 234 also introduce a potential source of clock skews, but the skew due to these components is inherently small.

The absence of any buffering between the synchronization bus 26 and the PLLs 234 explains why it is necessary to disable any clock buffer 206 that is driving a line leading to a powered-down cpuset; the MC88915 PLL cannot tolerate being driven when it is not powered-up. (If it had been permissible to provide buffering, it might then have been possible to choose buffering components which could tolerate being driven when powered-down; and it would then have been possible to leave all three of the clock buffers on the 'master' cpuset permanently enabled).

During normal operation of the computer, the term 'use_backplane_clock' in the logic equations will be true on each of the three cpusets, causing the PLLs 234 to use the clock signals received from the synchronization bus 26 as their reference signals. Each PLL 234 supplies (either directly or indirectly) all the clock signals required by the rest of its cpuset. Typically, the combination of the various features which have been described allows the PLLs of the three cpusets to maintain a synchronism of considerably better than 1 nanosecond.

It should be noted that the propagation delay from the oscillator 208 of the 'master' cpuset to the PLLs 234 will vary according to which of the three cpusets 20, 22 and 24 is the 'master' cpuset, but this is not important, since the phase of the oscillator 208 is not directly related to the operation of any other parts of the cpuset.

Each PLL 234 provides an output signal which indicates whether the internal oscillator of the PLL is in phase-lock with the reference-signal input to the PLL (during normal operation, this will be the reference signal on the clock input line 222 from the synchronization bus 26, since the signal 'use_backplane_clock' on the 'select' line 236 is true). This output signal is connected by a line 238 to the control logic block 36; it appears in the logic equations as the input term 'unlocked'. It will remain 'false' during normal operation of the computer; however, if the synchronization bus 25 should be affected by some kind of hardware failure, so that the PLL 234 cannot remain in phase-lock (for example, because the reference-signal on line 222 completely disappears), the 'unlocked' signal on line 238 will become true. Referring to the logic equations, it can be seen that the effects of this change are (i) to make false the signal 'use_backplane_clock' on line 236, so that form now on the PLL 234 takes its reference signal directly from the oscillator 208 on the cpuset, and (ii) to make true the 'e_state' signal on the line 58, so that the cpuset is now in the 'error' state. The change to the 'error' state does not immediately cause any interruption in the sequence of instruction execution by the CPU 38, but the first attempt to execute a data transfer over the main data transfer bus 10 after the change to 'error' state will fail, because the logic term 'aok' will remain false, so that the CPU 38 receives a transfer-error-acknowledge signal, exactly as if the comparator circuit 106 had detected a mismatch. More specifically, the events which occur in the control logic block 36 at this moment are as follows: because the 'e_state' signal is now true, the logic term 'goodcycle' can never become true; and this directly prevent the 'aok' term from becoming true.

Figure 10:
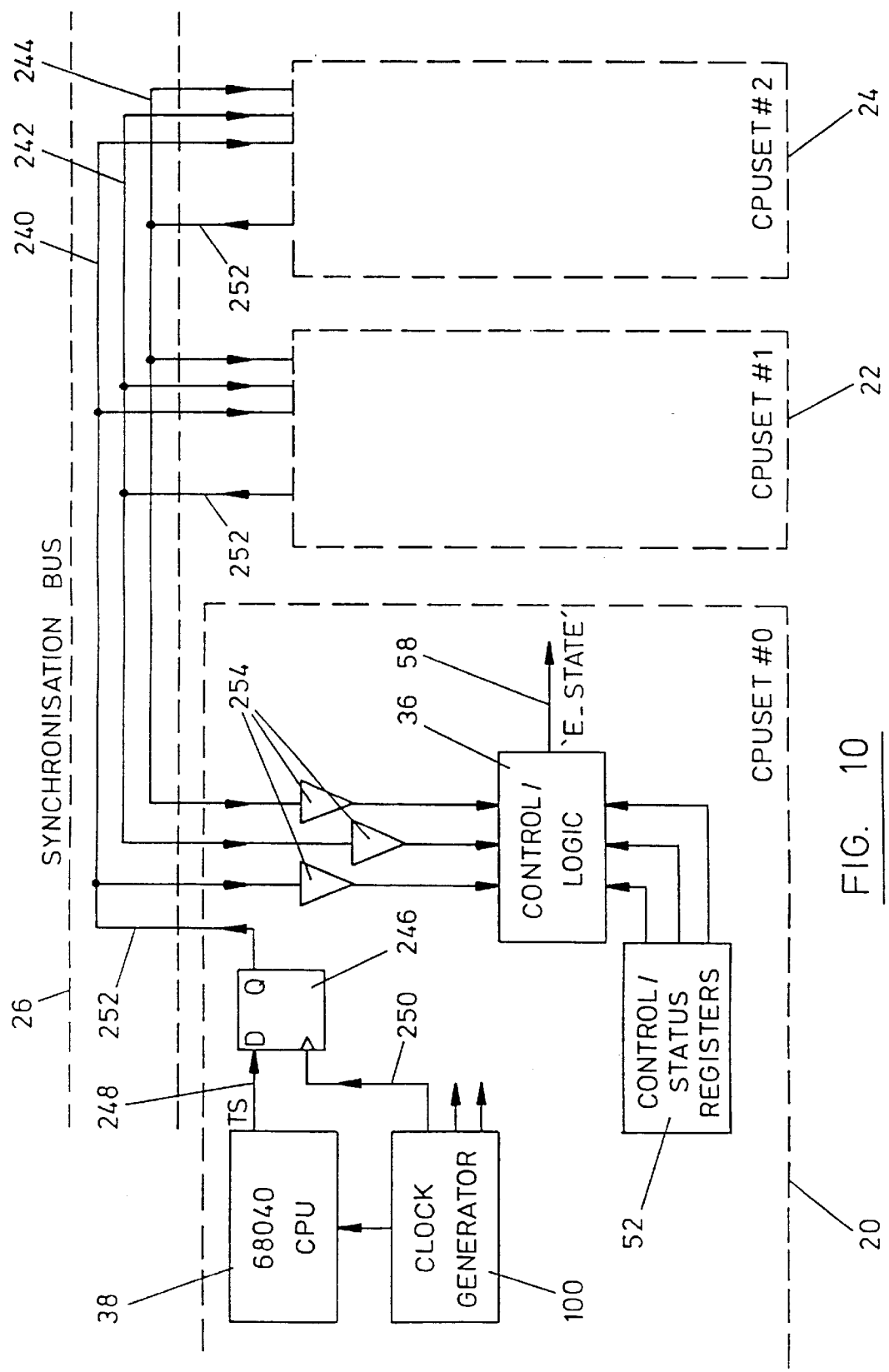
FIG. 10 is a block diagram, illustrating an error-detection circuit forming part of the central processor module of FIG. 2.

There is yet another mechanism which can detect a problem within the processor subsystem 12; the hardware details which implement this mechanism are illustrated by FIG. 10. As this figure shows, the synchronization bus 26 has three further lines 240, 242 and 244, which carry 'signature' signals, one generated by each of the cpusets 20, 22 and 24. More specifically, each cpuset includes a D-type flip-flop 246 whose D (data) input is connected by a line 248 to the TS (transfer start) pin of the CPU 38; the clock input of the flip-flop 246 is connected by a line 250 to the clock circuit 100, so that the flip-flop is clocked synchronously with the rest of the circuitry on the cpuset. The Q outputs of the three flip-flops 246 (on the three different cpusets) are connected via lines 252 to the three 'signature' lines 240, 242 and 244 in the synchronization bus.

The transfer-start pin of each CPU 38 will generate one pulse for each data transfer executed by that CPU. Therefore, since the three CPUs 38 will be executing identical code (during normal operation), in exact synchronism, the pulses on the three signature lines 240, 242 and 244 should all occur at exactly the same moments.

On each cpuset, the three signature lines 240, 242 and 244 are connected via buffers 254 to three inputs of the control logic block 36; the signals on these three lines appear in the logic equations as 'br_sign0', 'br_sign1' and 'br_sign2', respectively. As the equations show, the control logic 36 generates synchronized versions of these three signals ('dbr_sign0', 'dbr_sign1', and 'dbr_sign2', respectively), and these three signals are logically AND'ed with the 'signif0', 'signif1' and 'signif2' signals (already described in connection with the masking out of 'bus_ok' signals coming from a cpuset which is believed to have developed a problem). Those 'dbr_sign' signals which are not masked out by the 'signif' signals are compared in the equation defining the 'e_state' output line 58, so that any difference between these signals will cause the cpuset to change to the 'error' state. The effect of this change will be similar to the case already described, where a cpuset changes to the 'error' state as a result of a clock failure affecting the PLL 234; instruction execution may continue for a short time, but any attempt to execute a data transfer over the main transfer bus 10 will result in a 'transfer-error-acknowledge' signal being returned to the CPU 38, so that execution then passes to the software exception-handler.

Most of the foregoing description has been concerned with 'normal' operation of the computer (in other words, operation with one cpuset in the 'master' state and the other two in the 'checker' state), and with the monitoring mechanisms which check that no abnormal conditions have arisen. The description has not explained any details about the events which occur after an abnormal condition has been detected, and has caused the CPUs 38 to enter the software exception-handler (as a result of a 'transfer-error-acknowledge' signal).

A number of actions occur within the exception-handler; not all of these are relevant to the hardware features which have already been described, since (as shown by the logic equation for 'u_tea'), it is also possible for a 'transfer-error-acknowledge' signal to originate from other parts of the cpuset hardware. One of the actions taken by the exception-handler is to read the state of the 'e_state' line 58, via the control and status registers 52; if this line is not active, then the exception has not been caused by any of the special hardware features described above, and can be handled in a conventional manner.

If the 'e_state' line 58 is active, this indicates that the hardware has detected one of the types of problem described above, namely (i) a mismatch detected by the comparators in one of the comparator circuits 106, or (ii) a parity error detected by one of the parity checkers 108, or (iii) a clock failure causing the 'unlocked' signal from the clock circuit 100 to become active, or (iv) a mismatch between the 'signature' lines 240, 242 and 244. In all these cases, it is possible that instruction execution on the three cpusets may already be out of step, so that the cpusets enter the exception-handler at different moments. Therefore, in all these cases, the first action taken by the exception-handler is a 'software synchronization'. To perform this synchronization, the 'master' cpuset first waits for a delay period that is long enough to ensure that all three cpusets have entered the exception-handler, and then activates a signal line 364 in the synchronization bus 26. (The line 364 and its associated hardware are described later in connection with FIG. 16; as will become clear from that description, the line 364 has another function, distinct from the 'software synchronization'.) Each 'checker' cpuset, after entering the exception-handler, and determining that its 'e_state' line 58 is active, waits until it detects an active level on the line 364.

After activating the line 364 (in the case of the 'master' cpuset), or detecting the active level on line 364 (in the case of a 'checker' cpuset), the cpuset continues with the next stage of the exception-handler. In this stage, each cpuset calculates a number, representing the cpuset's own assessment of the probability that it has suffered a hardware fault and so caused the exception. This assessment is based largely on information which is available by reading from the read/write memory 40, from the control and status registers 52, and from performing self-test routines. Note that, although all three cpusets will be executing the same exception-handler code, they are no longer expected to run in exact synchronism; it is possible that each cpuset will take a different path through the code, since the self-test results and the status information on the faulty cpuset will be different from the corresponding information on the other two cpusets.

After performing this calculation, the CPU 38 of each cpuset waits for a period proportional to its calculated number. It then checks whether either of the other two cpusets appears to be in the 'master' state (by determining if a logic condition other than "no master" exists on lines 266, 268); if not, this suggests that the cpuset is the first of the three to come to the end of its calculated waiting period, and therefore the least likely to have suffered a hardware fault. In this case, the cpuset write to its control and status registers 52, to change the 'signif' signals, so that the 'bus ok' and 'br_sign' signals coming from the other two cpusets are no longer regarded as significant in the logic equations of the control logic block 36; it then changes itself to the 'master' state. Finally, it writes a 'magic number' to the read/write memory 46 of the other two cpusets, to indicate that it is successfully operating as the 'master' cpuset, and then returns from the exception-handler to the code (either operating system software, or application program) that was being executed when the exception occurred.

If, on the other hand, the CPU 38 finds, on coming to the end of its calculated waiting period, that another cpuset already appears to be in the 'master' state, it assumes initially that this other cpuset has already progressed to a later stage of the exception-handler, presumably because its calculated waiting period was shorter. In this case, the cpusets with longer waiting periods (which are still in the 'error' state) expect the 'master' cpuset already to have written the 'magic number' into their read/write memories 46. Each 'error' cpuset checks for the present of this 'magic number', after finding that there is already a 'master' cpuset; if the magic number is present, then the 'master' cpuset is assumed to be functioning correctly, and the other cpusets simply wait until the 'master' cpuset takes some further action (outside the exception-handler), to try to bring at least one of the cpusets back into the 'checker' state.

If, on the other hand, one of the cpusets in the 'error' state fails to find the magic number in its read/write memory 46, even though there appears to be a 'master' cpuset, it assumes that the 'master' cpuset may not be functioning correctly. It then waits for about 100 milliseconds, and if it still finds no magic number in its memory 46, and nothing else has interrupted this waiting period, this cpuset (the one which has failed to find any magic number) will try to change to the 'master' state; but since the hardware design ensures that only one cpuset can be 'master' at any given moment, it first has to stop the incorrectly-functioning cpuset from behaving as 'master'. It does this by powering-down both the other cpusets in the computer, so that then there is no hardware obstacle to becoming the 'master' cpuset. After this, it changes to the 'master' state, and its subsequent behavior is exactly the same as if it had been the first cpuset to come to the end of its calculated waiting period.

The hardware features which are needed on the cpusets 20, 22 and 24 to allow this implementation of the exception-handler will be described below, with reference to FIGS. 11 and 12.

An alternative reason for the cpusets to enter the exception-handler is that one of the other sub-systems connected to the slots 18 of the main data transfer bus 10 has either become defective, or has been removed. This will result in any attempted data transfer to or from that sub-system being terminated by a timeout signal from the timer circuit 160, as described above; the cpusets do not change to the 'error' state. In this situation, the main action taken by the exception-handler is to write data '1' to the slot-response memory 54, in the location corresponding to the sub-system that the cpusets were trying to access. Control then returns from the exception handler to the code which was trying to access the defective or absent sub-system; there is no interaction with the parts of the exception-handler which are invoked when the cpusets change to the 'error' state.

In the case where the cpusets change to the 'error' state (presumably because of the hardware problem), the exception-handler will leave the processor sub-system 12 in a state where one of the cpusets is in the 'master' state, and the others are either in the 'error' state or powered-down. Since it can be assumed that the hardware problem affects only one of the cpusets, the software of the system should then attempt to bring the non-defective, non-master cpuset back to the 'checker' state; this process is called 'cpuset re-integration. Since the cpusets are not longer running in synchronism, their memory contents (and also the status of the other parts of the hardware) will be different on different cpusets. This means that the memory contents must be copies from the 'master' cpuset to the cpuset which is being re-integrated. Most of this copying can be done by an application program which runs under the control of the operating system of the computer. When this application program has copied most of the memory contents, the operating system is temporarily suspended, and the remaining memory contents are copied. The clock circuits 100 of the cpusets are then brought into synchronism (previously, the cpuset which is being re-integrated has been running independently of the clock signals on the synchronization bus 26). Also, the status of all other parts of the hardware on the 'master' cpuset is translated into a memory image of this status, and this memory image is placed in memory, on both the 'master' cpuset and on the cpuset which is being re-integrated. Finally, the 'master' cpuset causes a 'reset' signal to be applied, synchronously, to the CPUs 38 (and other hardware) of all three cpusets 20, 22 and 24. The reset signal causes the CPUs 38 to change to executing code from their PROM memories 42; this code uses the memory image of the hardware status to bring the hardware (on all cpusets which have such a memory image) back to the status which previously existed on the 'master' cpuset, and then control is returned to the operating system, at the point where its operation was suspended.

The same process of cpuset re-integration will also be used, after a replacement cpuset has been substituted for a faulty cpuset, to bring the new cpuset into synchronism with the other two cpusets.

As with the actions which take place within the exception-handle or code, a number of hardware features are required in order to support this cpuset re-integration; these features are described below, with reference to FIGS. 15, 16 and 17.

Figure 11:
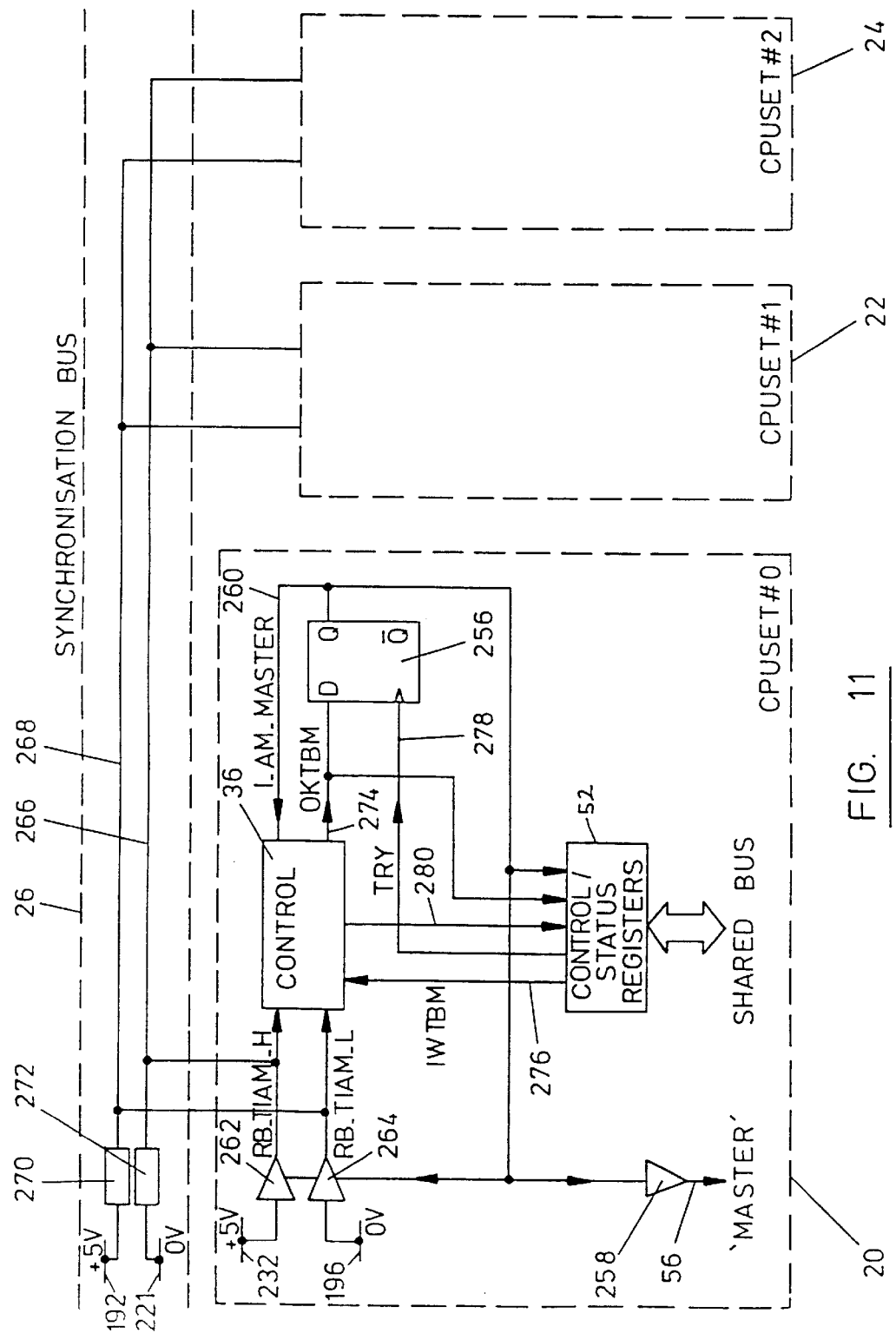
FIG. 11 is a block diagram, illustrating a master-arbitration circuit forming part of the central processor module of FIG. 2.

FIG. 11 illustrates those parts of the hardware whose purpose is to ensure that only one cpuset can be in the 'master' state at any given moment, and to allow a cpuset to become 'master', under software control.

As FIG. 11 shows, each cpuset has a D-type flip-flop 256, whose Q output is connected via a buffer 258 to the 'master' line 56 of the cpuset. In other words, the output from the flip-flop indicates whether the cpuset is in the 'master' state. This output is also connected (via a line 260) to an input of the control logic block 36 (it appears in the logic equations as 'i_am_master'), to the control and status registers 52 (allowing the CPU 38 to read whether the 'master' line is active), and to the 'enable' inputs of two three-state buffers 262 and 264. The data inputs of these buffers are connected respectively to a logic '1' level (a +5 volt supply line 232), and to a logic '0' level (the 0 volt (ground) line 196), so that these are the logic levels which appear at the buffer outputs when the cpuset is in the 'master' state (buffers enabled). If the cpuset is not in the 'master' state, the buffers are in their high-impedance state.

The outputs of the two buffers 262 and 264 of every cpuset are respectively connected to two lines 266 and 268 in the synchronization bus 26. To define the logic levels which appear on these lines when there is no cpuset in the 'master' state, the synchronization bus 26 also includes a pull-up resistor 270 connected between the line 268 and the +5 volt line 192, and a pull-down resistor 272 connected between the line 266 and 0 volt (ground) line 221. In other words, the logic levels on these lines will be the opposite of those appearing when one of the cpusets has its buffers 262 and 264 enabled.

The use of the two lines 266 and 268, each carrying a binary signal, provides four possible signal combination. Only two of these combinations are valid: logic level '0'/'1' indicate 'there is a master cpuset'. If either of the signal combinations '0' '0' and '1'/'1' appears, this indicates that some kind of hardware failure has occurred; for example, a short-circuit between the lines 266 and 268.

The two lines 266 and 268 of the synchronization bus are also connected to two inputs of the control logic block 36, on each of the cpusets 20, 22 and 24; the signals on these lines appear in the logic equations as 'rb_tiam_h' and 'rb_tiam_1', respectively. The control logic 36 generates an output signal on a line 274, which is connected to the D (data) input of the flip-flop 256; in the logic equation, this signal corresponds to the logic term 'ok_tbm', which becomes true if the conditions on at least one of the liens 266 and 268 indicate that there is at present no 'master' cpuset driving these lines. The term 'ok_tbm' also depends on the signal 'i_am_master' (received directly from the flip-flop 256) being false, and on an input signal ('iwtbm') received via a lines 276 from the control and status registers 52. A further output from the control and status register 52 is connected via a line 278 to the clock input of the flip-flop 256, so the actions which the CPU 38 of a cpuset must execute to become master are: first, write to the control and status register 52, to make the 'iwtbm' signal active, on line 276; and then write again to this register, to generate a transition on the clock input of the flip-flop. If at least one of the lines 266 and 268 indicates that there is no 'master' cpuset at the moment of this transition, the D-input of the flip-flop (signal 'ok_tbm') will be active, and the flip-flop will change state, putting the cpuset into the 'master' state. This immediately has the effect of enabling the buffers 262 and 264, so that the lines 266 and 268 of the synchronization bus 26 change state, and no other cpuset can then become master.

It will be noticed that the foregoing description does not mention negation of the 'e_state' signal, although this is a necessary step in changing a cpuset from the 'error' state to the 'master' (or 'checker') state. The only hardware that is needed to accomplish this negation is a line 280, which connects an input of the control logic block 36 to the control and status registers 52; in the logic equations, this line corresponds to the logic term 'sync'. Reference to the logic equation for 'e_state' will show that 'e_state' will remain active, once asserted, until 'sync' is asserted; at this time, assuming that there are not other error conditions, 'e_state' will become false. During the process of cpuset re-integration, the action of writing to the control and status register 52, to activate 'sync', will take place after the CPUs 38 (on both the 'master' and the new 'checker') have been reset; in other words, the action takes place, simultaneously on both cpusets, under the control of code in the read-only memories 42 of the cpusets.

Figure 12:
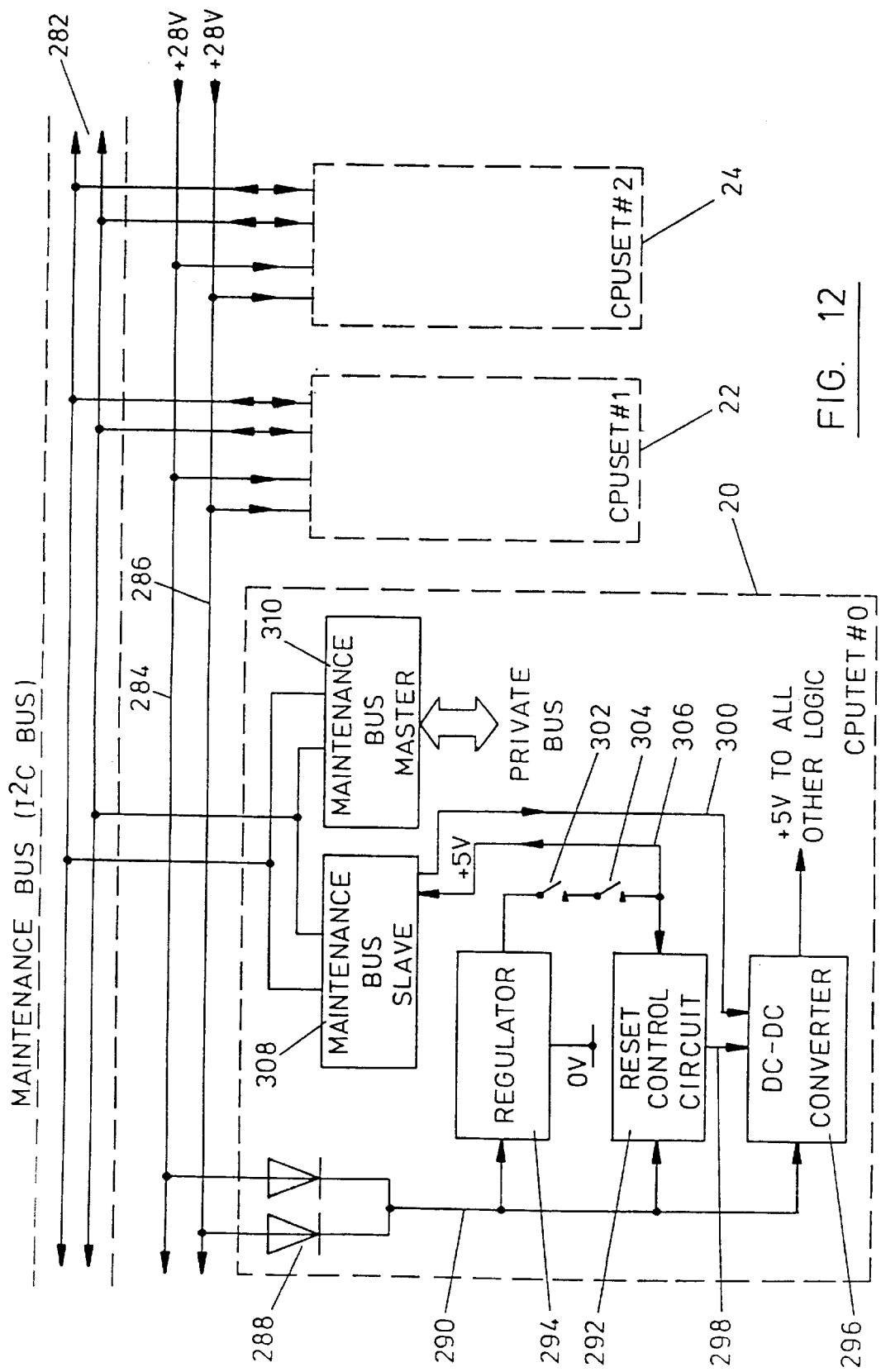
FIG. 12 is a block diagram, illustrating the power-distribution circuits embodied in the central processor module of FIG. 2.

FIG. 12 is a block diagram, illustrating some aspects of the power supply circuits within the processor sub-system. These circuits are so designed that a cpuset can be removed from or inserted into its place in the computer, without powering-down the rest of the computer. They also allow any given cpuset to be powered-up or powered-down, as a result of software commands executed by one of the other cpusets; to allow this interaction, the three cpusets are inter-connected by a two-wire 'maintenance bus' 282. The bus 282 is implemented as an I2C bus, for which interface devices are commercially available, so its details will not be described here.

Power is distributed to the three cpusets 20, 22 and 24 (and to the other sub-systems of the computer) via two 28 volt power supply lines 284, 286; two lines are used to provide redundancy. On each cpuset, the power received from the two lines 284 and 286 is commoned together by two diodes 288, and then distributed over a single power line 290 within the cpuset. There are no switching devices between the power lines 284, 286 and the power line 290, so, when a cpuset is inserted into a computer whose power lines 284, 285 are already energized, the power line 290 will immediately become similarly energized.

The line 290 is connected to three items on the cpuset: a reset control circuit 292, a three-terminal regulator 294 which steps the 28 volt supply down to provide a +5 volt output, and a DC-DC converter circuit 296 which also provides a +5 volt output, but only when enabled by active 'enable' signals on both of two control signal lines 298 and 300. For reasons which will be explained, there will be no active signal on the line 298 when the cpuset is first inserted into the computer, and so the Dc-DC converter 296 remains disabled, and does not place any load on the power supply line 290. The +5 volt output of the regulator 294 is connected, via two switches 302 and 304 in series, to a +5 volt distribution line 306; the switches 302 and 304 form part of a mechanical interlocking system (described later with reference to FIGS. 13 and 14), which ensures that both the switches 302 and 304 must be open-circuit as the cpuset is inserted into the system. This means that, immediately after insertion, the only load placed on the power lien 290 by the regulator 294 is its quiescent current (typically 5 milliamps). The reset control circuit 292 comprises a TL7705 integrated circuit, which represents a load of less than 1 milliamp. The total load on the power supply line 290 during insertion of the cpuset is therefore extremely small, so that no problems arise from inserting the cpuset while the power supply lines 284, 286 are energized.

After the cpuset has been inserted into the computer, the two interlock switches 302 and 304 can be closed. This action energizes the +5 volt power supply line 306, which is connected to a 'sense' input of the reset control circuit 292. The output of this circuit is connected to the control signal line 298, which enables or disables the DC-DC converter 296. So long as no voltage is present at the 'sense' input of the reset control circuit 292, this circuit will maintain the line 298 at its; inactive level, so that (as mentioned above), the DC-DC converter 296 is disabled immediately after insertion of the cpuset. When the two switches 302 and 304 are closed, the reset control circuit 292 maintains the inactive level on the line 298 for a delay period, and then changes it to an active level, so that (subject to the other control line 300 being to an active level, the DC-DC converter 296 will be enabled.

The +5 volt supply line 306 also provides power to some of the interface circuits which are connected to the maintenance bus 282; in particular, it provides power to a maintenance bus 'slave' interface 308, which consists of a PCF8574 integrated circuit. One output of this interface 308 is connected to the control line 300 of the DC-DC converter 296; it is a feature of the PCF8574 device that its output lines will go to an 'active' state on power-up, so the DC-DC converter 296 will be enabled as soon as the delay period imposed by the reset control circuit 292 has expired. The +5 volt output of the converter 296 is connected to supply all other logic on the cpuset, so the cpuset is now fully powered-up.

If a cpuset is removed from the computer, this will result in the DC-DC converter 296 being disabled again. The sequence of events which occurs in this case is that the switches 302 and 304 will first be opened (removal of the cpuset is physically impossible if these switches are closed). This removes the +5 volt supply from the 'sense' input of the reset control circuit 292; as soon as the voltage at this input has fallen below 4.7 volts, the circuit 292 will de-activate the signal on the line 298, so that the converter 296 is disabled. It is then safe to remove the cpuset, since the load on the power supply line 290 has then been reduced to the same low value as during insertion of the cpuset.

The cpuset also includes a maintenance bus 'master' interface 310, connected both to the maintenance bus 282 and to the private bus 28 of the cpuset. This master interface, which is implemented using a PCC 8584 integrated circuit, provides the channel via which the CPU 38 of the cpuset can place signals on the maintenance bus 282, to cause other cpusets (or even itself) to be powered-up or powered-down.

Figure 13:
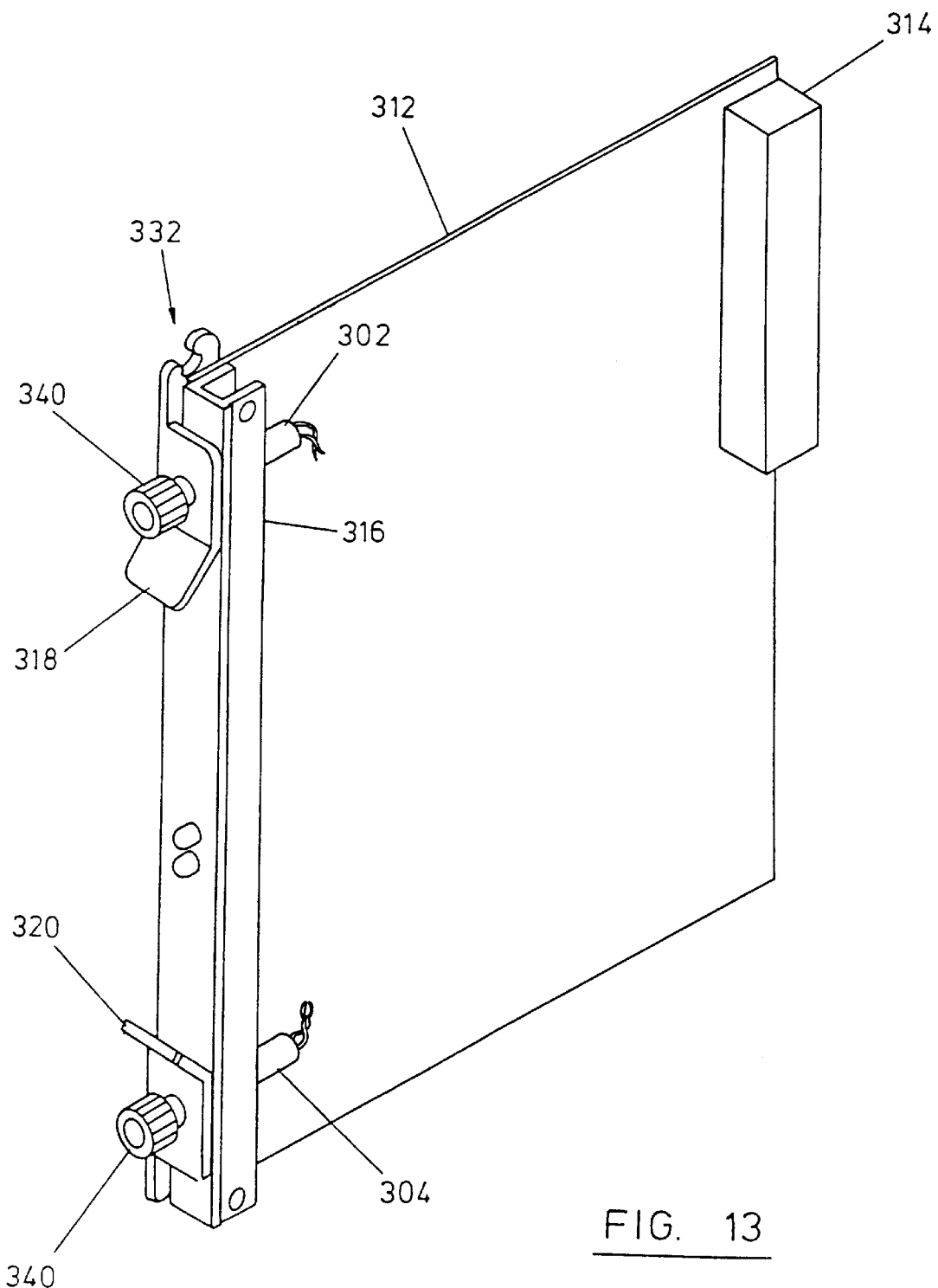
FIG. 13 is an isometric view, showing the physical construction of the central processor module of FIG. 2, and in particular, showing two interlock switches.
Figure 14:
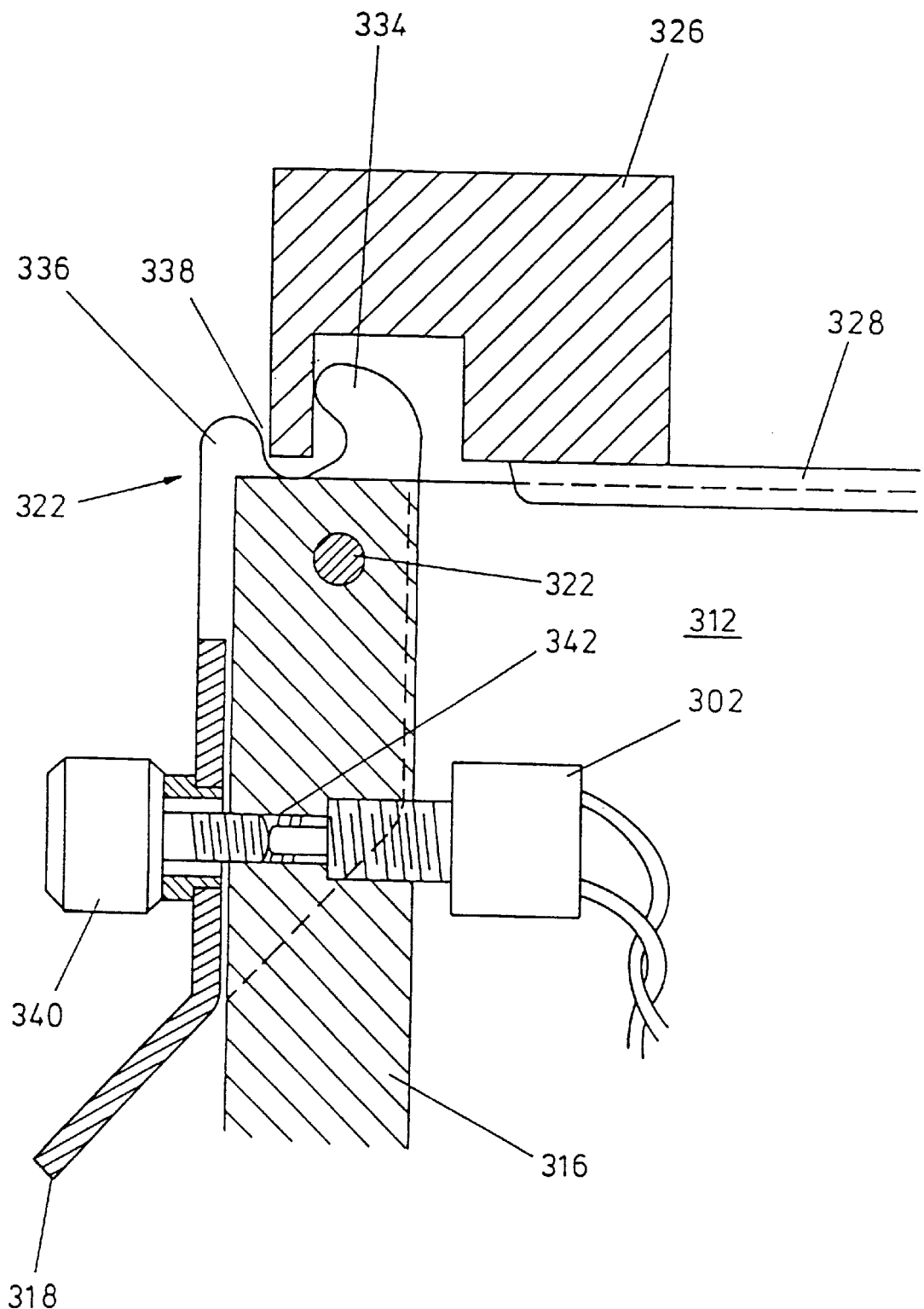
FIG. 14 is a vertical section through the mechanism associated with one of the interlock switches shown in FIG. 13.

FIGS. 13 and 14 show the mechanical construction of one of the cpusets 20, 22 or 24; in particular, these figures illustrate the mechanical details of one of the interlock switches 302, 304.

The cpuset comprises a printed-circuit board 312, on which all the electronics of the cpuset are mounted, with the exception of the two interlock switches. A connector 314 is mounted at the rear edge of the board 312, to establish the connections between the cpuset and the various busses (main data transfer bus 10, synchronization bus 26, and maintenance bus 282), while a front bar 316 is mounted at the front edge of the cpuset. One of the purposes of the front bar 316 is to retain the cpuset in place in the computer; for this purpose, two injector/ejector levers 318 and 320 are pivoted to the front bar, near its top and bottom ends respectively. The pivot connection between each of these levers and the front bar 316 is provided by a screw 322, which is visible in FIG. 14. FIG. 14 also shows part of the fixed structure of the computer, consisting of a bar 324, which supports the front end of a channel-shaped guide 328 for the top edge of the printed-circuit board 312; a similar bar and guide (not shown in FIG. 14) support the bottom edge of the board 312.

When the cpuset is in its place in the computer, each of the levers 318 and 320 lies in the position illustrated by FIG. 14. As this figure shows, each of the injector/ejector levers has an end portion 332 which has an injector jaw 334, an ejector jaw 336, and a throat 338 between the jaws 334 and 336. A part of the profile of the fixed bar 324 lies in the throat 338, so that removal of the cpuset from the computer is prevented by the injector jaws 334 abutting against the rear surfaces of the bars 324. Each of the levers also has a handle portion 339, at its end remote from the jaws 334 and 336, so that it can be pivoted by hand, forwards and away from the front bar 316. This pivoting will bring the ejector jaws 336 into contact with the front surfaces of the bars 324, thereby moving the cpuset forwards in the guides 328, so that the connector 314 disengages, and the cpuset can be removed.

Insertion of a cpuset into a computer involves pivoting the levers 318 and 320 in the opposite direction, so that the injector jaws of the levers abut against: the rear surfaces of the bars 324, and thereby push the cpuset into position, causing the connector 314 to engage correctly as this movement takes place.

To ensure that the levers 318 and 320 do not inadvertently move away from the position shown in FIG. 14, in which they keep the cpuset positively in its place, each level has a captive thumbscrew 340, and the front bar 316 has two threaded holes 342, positioned to line up with the thumbscrews 340 when the levers are in the position of FIG. 14. After the levers have been pivoted to this position, the threaded ends of the thumbscrews tightened, so that the levers 318 and 320 are locked in position.

As FIG. 14 also shows, the two interlock switches 302 and 304, each of which is a plunger-action normally-open microswitch, are mounted on the rear of the front bar 316, behind the threaded holes 342. The length of the thumbscrews 340 is so chosen that, when these thumbscrews are fully tightened up, their threaded ends will contact the plungers of the two interlock switches 302 and 304, thereby moving them to their closed positions, and causing the cpuset to power-up, as already described with reference to FIG. 12.

Figure 15:
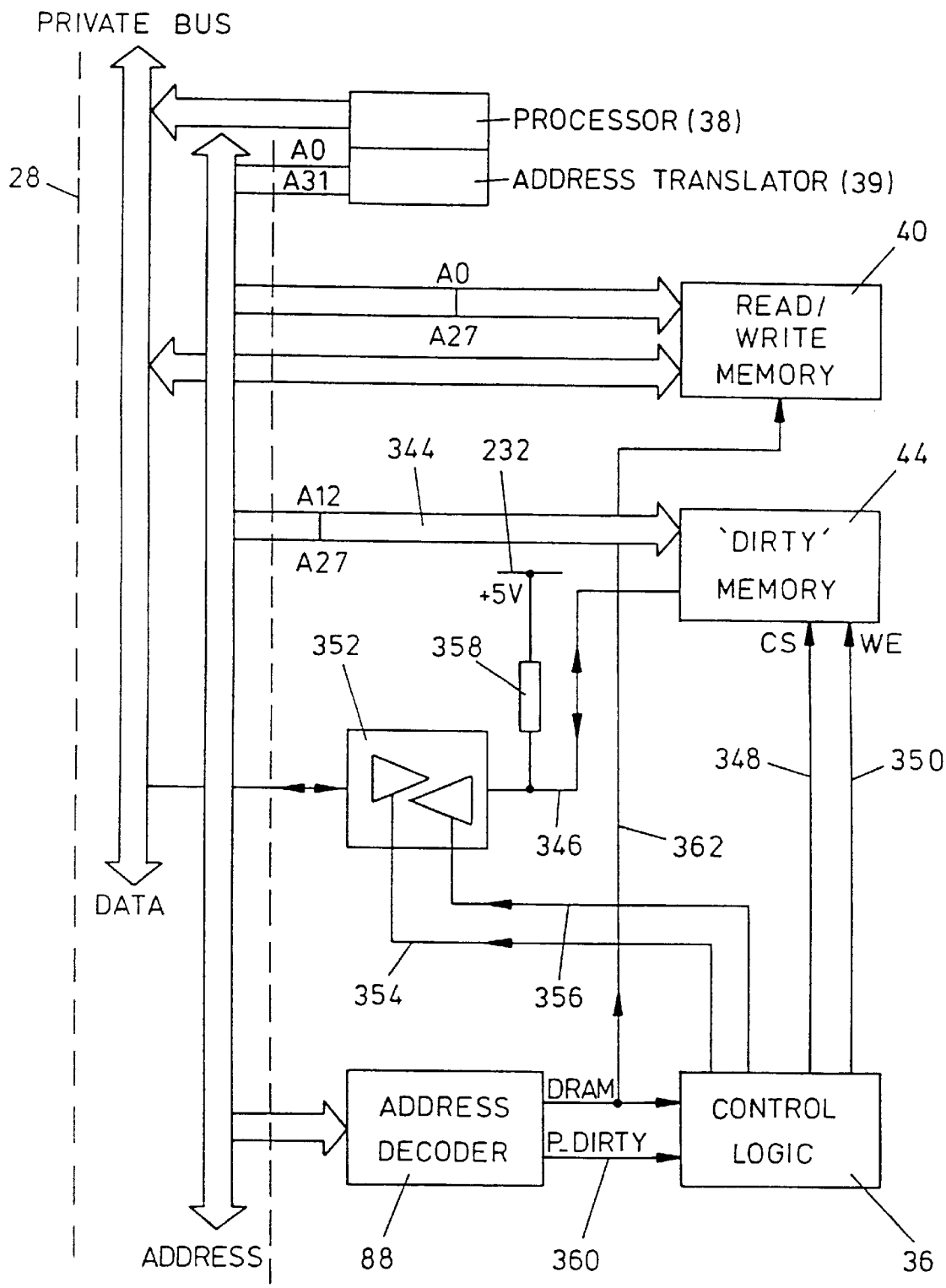
FIG. 15 is a block diagram of a further special-purpose memory forming part of the central processor module of FIG. 2.

FIG. 15 shows some details of the 'dirty' memory 44, whose special purpose is to assist with the copying of memory contents that takes place during cpuset re-integration. As explained above, most of this copying process will take place with the operating system of the computer still running. This implies that it is possible that the contents of a location in the read/write memory 40 (the source of the data being copied) will be modified by the operating system, or by some other program running under the control of the operating system, after it has already been copied to the cpuset that is being re-integrated. Such a memory location is said to have been 'dirtied' by the operating system, meaning that its contents no longer match the corresponding memory location on the cpuset to which it was previously copied. To make the memory location 'clean' again, its new contents must be copied to the cpuset that is being re-integrated.

The purpose of the dirty memory 44 is to record which areas of the memory 40 are 'dirty', and which are 'clean'. The dirty memory 44 is a 1-bit wide memory, and each bit location in this memory records the state ('dirty' or 'clean') of a consecutive group of locations in the read/write memory 40. This requires that any 'write' data transfer to the read/write memory 40 should automatically result in the corresponding bit in the dirty memory 44 being set to the 'dirty' state. The dirty memory 44 records write-accesses to the memory 40 on the basis of the translated addresses provided by the usual address translator 39 which is operative between the processor 38 and the memory 40 (and may form part of the processor).

The dirty memory 44 has a group of 16 address lines 344, which are connected to the most-significant 16 of the address lines that are connected to the read/write memory 40 (these are address lines in the private bus 28). In other words, the read/write memory 40 can be regarded as being divided into 65,536 'pages', and any access to a given one of these pages will result in a distinctive address appearing on the address lines 344 of the dirty memory 44. The dirty memory also has a data line 346, a 'select' line 348, and a 'write-enable' line 350. The data line 346 is connected via a bi-directional buffer 352 to the private bus 28; this buffer has 'enable' inputs 354 and 356, for its two directions of transmission. There is also a pull-up resistor 358 connected between the data line 346 and the +5 volt line 232, so that, if neither the buffer 352 nor the dirty memory 44 is driving the line 346, this line will be at a logic '1' level. This is the situation which occurs during a data transfer to the read/ write memory 40.

The 'select', 'write-enable' and 'buffer-enable' lines 348, 350, 354, and 356 are all connected to outputs from the control logic block 36; the corresponding terms in the logic equations are 'dirty_cs', 'dirty_we', 'dirty_bwe', and 'dirty_oe'. Each of these terms depends on the 'p_dirty' input to the control logic 36, which comes via a line 360 from the address decoder 88, to signal a 'normal' access to the dirty memory 44; but, in addition, the 'dirty_cs' and 'dirty_we' terms will become active during a write data transfer to the read/write memory 40 (indicated by the signal 'dram', on a line 362 from the address decoder 88, and the signals 'u_ts' and 'u_write' from the CPU 38). Because the 'dirty_bwe' term is not active during such a write data transfer, the data line 346 will be a logic '1', and this level will be written into the dirty memory 44, at the location corresponding to whatever address of the read/write memory 40 was being accessed.

The information which is provided by the dirty memory 44 allows an iterative method to be used for copying the memory contents, during cpuset re-integration. The method involves the following steps: first set all bits of the dirty memory to '1'; then make a scan through this memory, and, for every bit that is '1', set the bit to '0' instead, and copy the corresponding page of read/write memory 40 to the cpuset that is being re-integrated. Then repeat this scan, so that the new contents of any newly dirtied pages are copied. (The possibility of a page being dirtied again, after being copied, arises because the computer has a multi-tasking operating system, and this iterative copying method may be simply one of a number of tasks that are being executed by the computer, sharing the processing capacity of the computer in an interleaved manner.) After several repetitions of this scan through the dirty memory 44, the number of dirty pages should have become fairly small, and the operating system can then be temporarily suspended, to perform the remaining stages of the cpuset re-integration.

These remaining stages of re-integration can be summarized as follows: 1

Create a memory image (in the read/write memory 40) of the status of some or all of the hardware of the cpuset; for example, it would typically be necessary to record the contents of the registers of the receiver/transmitter 48, the timer 50, the control registers 52, and the control logic 36;

Copy to the new cpuset any pages of the memory 40 that are indicated as dirty by the 'dirty' memory 44; this copying will always include the page or pages in which the memory image has just been created, by the previous step;

The master cpuset now causes all the cpusets (including itself) to be reset, in exact synchronism. This brings all the hardware of the cpusets to a known state, which is identical on all the cpusets (with the possible exception of any parts of the hardware that can be initialized by software, after the reset);

Among the software that is executed (in synchronism, by all cpusets) after the reset, there is a routine which reads the part of the memory 40 containing the memory image of the hardware status of the cpuset, and uses this memory image to bring the hardware back to the status that it had when the operating system was suspended;

Finally, the operating system is allowed to resume operation, with the master cpuset in exactly the same condition as when the system was suspended, and with the newly re-integrated cpuset running in exact synchronism with the master.

Figure 16:
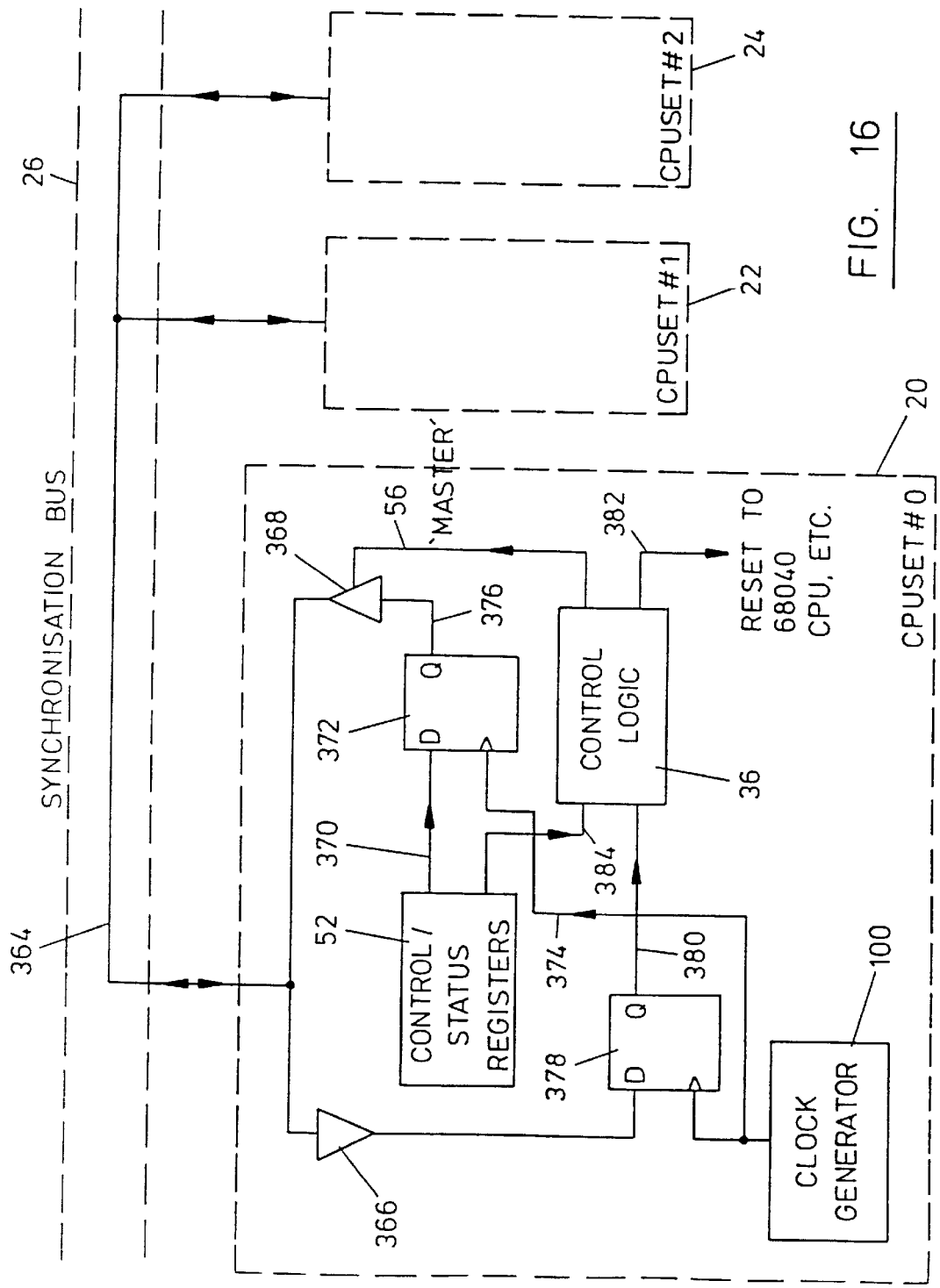
FIG. 16 is a block diagram illustrating a circuit which allows resetting of the central processor module, under software control.
Figure 17:
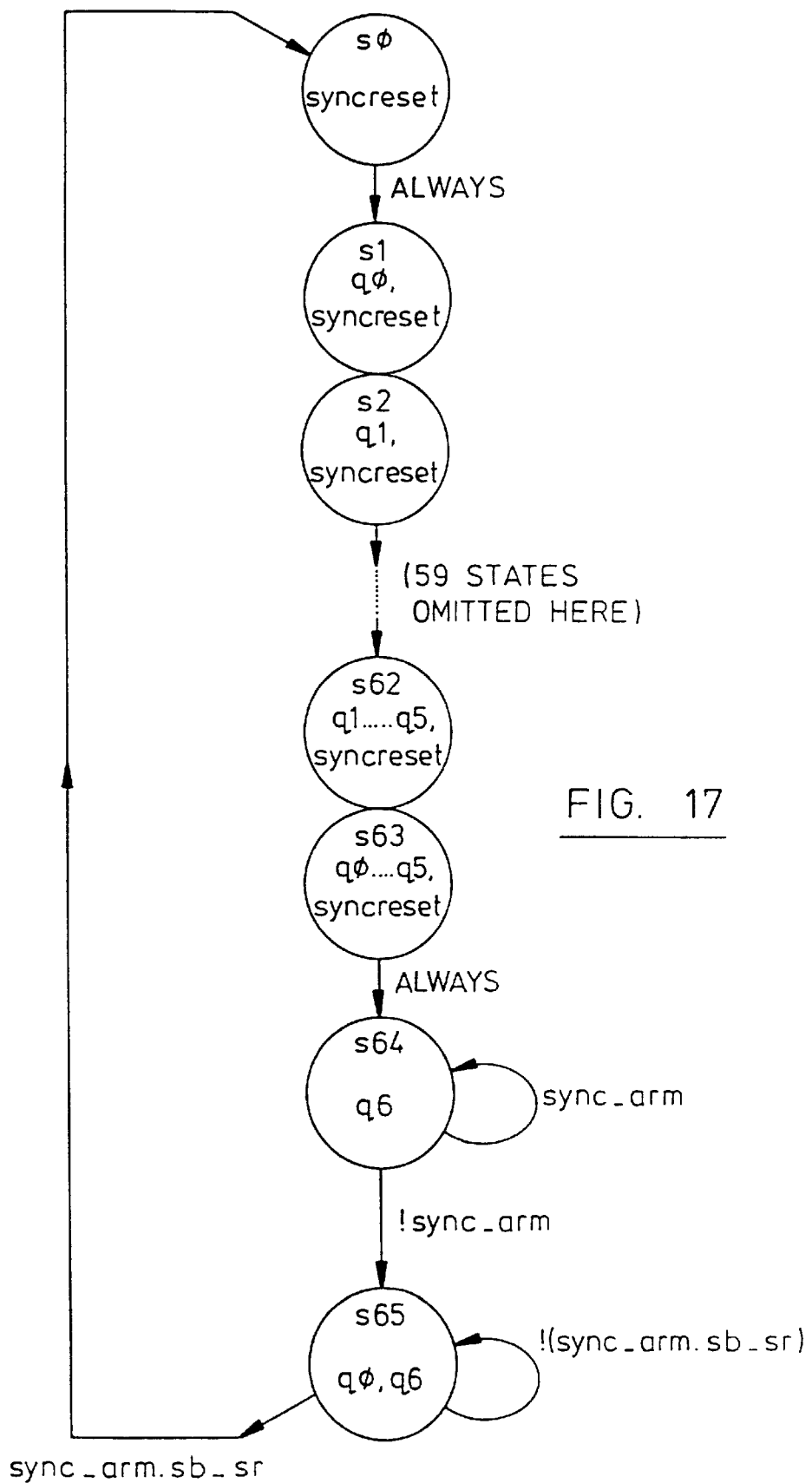
FIG. 17 is a state-transition diagram, illustrating the operation of the circuit of FIG. 16.

Among the steps listed above, the third step (the synchronous resetting of the cpusets) requires the cpusets to have special hardware features; these features are illustrated in FIG. 16. This hardware includes a line 364 in the synchronization bus 26; on each cpuset, the line 364 is connected both to the input of a buffer 366, and to the output of a three-state buffer 368 whose 'enable' input is connected to the 'master' line 56, so that only the 'master' cpuset can drive the line 364. Activation of the line 364 by the 'master' cpuset is the event which actually triggers the resetting of the cpusets; but the resetting hardware of a cpuset also has to be 'armed' by a software command, in order that it shall respond to the signal on the line 364 by resetting itself.

The part of the hardware which is concerned with driving the line 364 in the synchronization bus 26 is a line 370 which is connected from an output of the control and status registers 52 to the D (data) input of a D-type flip-flop 372; this flip-flop has its clock signal input connected to a line 274 which carries a clock signal from the clock circuit 100, so that the flip-flop changes state synchronously with other events on the cpuset. The Q output of the flip-flop feeds the data input of the buffer 368, via a line 376, so that a write to the control and status registers 52 is all that is needed to activate the line 364.

The hardware which responds to the line 364 includes the buffer 366, whose output is connected to the D input of another D-type flip-flop 378; this flip-flop also receives its clock signal from the line 374. The Q output from this flip-flop is connected by a line 380 to the control logic block 36; the corresponding term in the logic equations is 'sb_sr'. This term, together with the logic term 'sync_arm' (which corresponds to a signal received by the control logic 36 from the control and status registers via a line 384), controls the output logic term 'syncreset'; the corresponding output from the control logic 36 appears on a line 382, which is connected to all parts of the cpuset that require resetting to achieve cpuset re-integration. The relationship between the logic terms 'sb_sr', 'sync_arm' and 'syncreset' is illustrated by the state-transition diagram of FIG. 17. During normal operation of the cpuset, the control logic 36 will be in the state S65. If both logic terms 'sb_sr' and 'sync_arm' then become active, the logic will change to state S0, in which state the 'syncreset' signal becomes active. The logic will then stop sequentially through states S1 to S64, one step for each clock pulse received by the control logic 36. The 'syncreset' term remains active up to and including state S63, sub when the logic reaches state S64, the 'syncreset' term is de-activated, and the rest of the hardware of the cpuset now comes out of reset, so that the CPU 38 begins executing code from the read-only memory 42. The control logic 36 remains in state S64 until the 'sync_arm' term is negated, which will be one of the first actions performed by the CPU 38. After this, the control logic 36 returns to state S65.

The purpose of the 'sync_arm' signal is to ensure that a fault on the line 364 in the synchronization bus 26 cannot cause inadvertent resetting of the cpusets 20, 22 and 24; if such inadvertent resetting were possible, the line 364 would represent a single point of failure, which is undesirable.

The following are the logic equations which describe the operation of the control logic circuit 36:

State definitions

```
|define S0     (!tb_as & !tb_ds & !b_dta & !id1 & !id0 &!b_dtea)
|define S1     (!tb_as & !tb_ds & !b_dta & id1 & !id0 & !b_dtea)
|define S2     (!tb_as & !tb_ds & !b_dta & !id1 & id0 & !b_dtea)
|define S3     ( tb_as & tb_ds & !b_dta & !id1 & !id0 & !b_dtea)
|define S4     ( tb_as & !tb_ds & b_dta & !id1 & !id0 & !b_dtea)
|define S5     (!tb_as & !tb_ds & !b_dta & !id1 & !id0 & b_dtea)
|define S6     (!tb_as & !tb_ds & b_dta & !id1 & !id0 & !b_dtea)
|define S65               (q6 & !q5 & !q4 & !q3 & !q2 & !q1 & q0)
|define S64               (q6 & !q5 & !q4 & !q3 & !q2 & !q1 & !q0)
|define S0_63             (!q6)
|define S63               (q5 & q4 & q3 & q2 & q1 & q0)
|define S31_mod_32        (q4 & q3 & q2 & q1 & q0)
|define S15_mod_16        (q3 & q2 & q1 & q0)
|define S7_mod_8          (q2 & q1 & q0)
|define S3_mod_4          (q1 & q0)
|define S1_mod_2          (q0)
|define S0_mod_1          (1)
```

Combinatorial terms

| | |
|---|---|
| to_buse_a = | u_owner & master & real_tip & bus & !d_real_tip + u_owner & master & real_tip & bus & to_buse_a + to_buse_a & d_real_tip & master; |
| from_buse_a = | bus_owner & bus_access; |
| to_buse_d = | u_owner & master & bus & u_write & real_tip & !d_real_tip + u_owner & master & bus & u_write & real_tip & to_buse_d + u_owner & master & to_buse_d & d_real_tip + bus_reply & !rbus_write & rbus_as; |
| from_buse_d = | u_owner & bus & !u_write & real_tip & !bus_reply + bus_owner & bus_access & rbus_write & rbus_as; |
| u_ta = | b_dta & aok & !u_write + b_dta & u_write + p_ta & u_owner + (any other transfer-acknowledge from on-board devices); |
| u_tea = | b_dta & !aok & !u_write + b_dta + timeout_tea + (any transfer-error-acknowledge from on-board devices); |
| b_rpe = | b_dta & !aok & !u_write; |
| b_mce = | b_dtea; |
| ok_tbm = | iwtbm & !i_am_master & (!rb_tiam_h + rb_tiam_1 ); |
| tiam_error = | !rb_tiam_h & !rb_tiam_1 + rb_tiam_h & rb_tiam_1 + i_am_master & (rb_tiam_1 + !rb_tiam_h); |
| aok = | goodcycle & !bus + goodcycle & (!signif0 + bus_ok0) & (!signif1 + bus_ok1) & (!signif2 + bus_ok2); |
| goodcycle = | real_tip & !e_state; |

Registered (clocked) terms

| | |
|---|---|
| d_real_tip = | real_tip; |
| id0 = | realtip & u_owner & ( S1 ); |
| id1 = | real_tip & u_owner & ( S0 & bus ); |
| tb_as = | real_tip & u_owner & ( S2 & aok & !give_ta + S3 & !u_tea ); |
| tb_ds = | real_tip & u_owner & ( S2 & aok & !give_ta + S3 & !rsb_ta & !u_tea ); |
| b_dta = | real_tip & u_owner & ( S2 & aok & give_ta + S3 & rsb_ta & !u_tea ); |
| b_dtea = | real_tip & u_owner & S2 & !aok; |
| srbus_as = | bus_as; |
| bus_reply = | srbus_as & (bus_owner + !e_state) & address_match; |
| bus_access = | srbus_as & address_match; |
| tbus_ta = | srbus_as & (bus_owner + !e_state) & ( p_ta & bus_reply + tbus_ta ); |
| u_owner = | u_owner & !e_state + u_owner & real_tip + real_tip & !bus_access & !bus_owner + u_owner & !bus_access; |

-continued

| | |
|---|---|
| bus_owner = | e_state & ( bus_owner & bus_access + bus_access & !u_owner + bus_owner & !real_tip); |
| mc_silly = | !master & ( !signif0 & !signif1 + !signif1 & !signif2 + !signif2 & !signif0 ); |
| e_state = | b_dta & !aok & !u_write + b_dtea + s_unlocked + signif0 & signif1 & !dbr_sign0 & dbr_sign1 + signif0 & signif1 & dbr_sign0 & !dbr_sign1 + signif1 & signif2 & !dbr_sign1 & dbr_sign2 + signif1 & signif2 & dbr_sign1 & !dbr_sign2 + signif0 & signif2 & !dbr_sign0 & dbr_sign2 + signif0 & signif2 & dbr_sign0 & !dbr_sign2 + e_state & !sync + mc_silly; |
| s_unlocked = | unlocked; |
| dbr_sign0 = | br_sign0; |
| dbr_sign1 = | br_sign1; |
| dbr_sign2 = | br_sign2; |
| real_tip = | u_tip & ( u_ts & io + real_tip & !u_tea & !u_ta ); |
| syncreset = | S0_63; |
| q6 = | S63 + S64 + S65 & !sync_arm + S65 & !sb_sr; |
| q5 = | S0_63 & (!q5 & S31_mod_32 + q5 & !S31_mod_32); |
| q4 = | S0_63 & (!q4 & S15_mod_16 + q4 & !S15_mod_16); |
| q3 = | S0_63 & (!q3 & S7_mod_0 + q3 & !S7_mod_0); |
| q2 = | S0_63 & (!q2 & S3_mod_4 + q2 & !S3_mod_4); |
| q1 = | S0_63 & (!q1 & S1_mod_2 + q1 & !S1_mod_2); |
| q0 = | S0_63 & (!q0 & S0_mod_1 + q0 & !S0_mod_1) + S64 & !sync_arm + S65 & !sync_arm + S65 & !sb_sr; |

Required Inputs
master (from FF)
u_ts, u_tip (timing signals, from CPU)
bus, io (from decoder)
u_write (from private bus)
rbus_write, rbus_as (buffered in from B-bus; we drive these B-bus lines
if
to_buse_a, using the tb_as and f_write signals)
bus_as (directly from B-bus, for slave circuits)
rsb_ta (synchronized and buffered in from B-bus sb_ta; this is the
synchro version of b_ack, distributed by the master cpuset for the other
cupsets),
give_ta (from SRR)
timeout_tea (from teacake)
address_match (from B-bus signal decoder)
p_ta (acknowledge from on-board devices, for slave accesses)
signif0/1/2, sync, iwtbm (from register)
br_sign0/1/2 (from B-bus)
unlocked (from clock generator)
rb_tiam_h/1 (from bus; drivers enabled against pull-up/down if master)
bus_ok0/1/2 (from B-bus)

While the invention has been particularly shown and described with reference to specific embodiments thereof, it will be understood by those skilled in the art that the foregoing and other changes in the form and details may be made therein without departing from the spirit or scope of the invention. Consequently, the scope of the invention should be determined solely with respect to the following claims.

What is claimed is:

1. A computing system comprising:
   two or more microprocessors, wherein each said microprocessor has a clock output configured to generate a clock signal and a clock input configured to accept said clock signal, wherein said clock input of each said microprocessor is coupled to said clock output of each said microprocessor by a corresponding clock line, wherein signals propagate on each said clock line from one of said clock outputs to one of said clock inputs in a corresponding propagation time, wherein said corresponding propagation times between one of said clock outputs and any of said clock inputs are equal, and wherein said clock signal generated at one of said clock outputs arrives simultaneously at said clock inputs.

2. The computing system of claim 1 wherein said clock inputs comprise unbuffered PLL inputs, wherein each said clock line traverses a corresponding distance between one of said clock outputs and one of said clock inputs, and wherein said corresponding distances between one of said clock outputs and any of said clock inputs are equal.

3. The computing system of claim 2 wherein each said clock line has a first end coupled to said corresponding clock input and a second end coupled to a termination, and wherein said clock outputs are coupled to said clock lines between first and second ends.

4. The computing system of claim 3 wherein each said termination is configured to prevent reflection of said clock signal at said second end of said corresponding clock line.

5. The computing system of claim 4 wherein each said termination comprises a resistor and a capacitor in series.

6. The computer system as recited in claim 5, wherein value of said resistor is chosen to match a characteristic impedance of each of said clock lines.

7. The computing system of claim 5 wherein each said clock input is coupled to a single one of said clock lines and wherein each of said clock outputs is coupled to each of said clock lines by a tri-state buffer, and wherein a single one of said tri-state buffers coupled to each of said clock lines is enabled at a time.

8. The computing system of claim 7 wherein said clock output of each said microprocessor comprises two or more of said tri-state buffers, and wherein each of said tri-state buffers in said clock output is coupled to a separate one of said clock lines.

9. The computing system as recited in claim 8, wherein said clock output further comprises crystal-controlled oscillator.

10. The computing system as recited in claim 1, wherein said computer system includes a synchronization bus comprising a plurality of signal lines, wherein said signal lines include said each said clock line.

11. The computer system as recited in claim 10, wherein said synchronization bus includes signal lines corresponding to each of said two or more microprocessors, wherein each of said signal lines is configured to convey a signal indicating whether a corresponding microprocessor is powered on.

* * * * *